United States Patent
Huang

(10) Patent No.: US 12,498,443 B2
(45) Date of Patent: Dec. 16, 2025

(54) POSITIONING INFORMATION DETERMINING METHOD AND COMMUNICATION APPARATUS

(71) Applicant: HUAWEI TECHNOLOGIES CO., LTD., Shenzhen (CN)

(72) Inventor: Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 574 days.

(21) Appl. No.: 17/974,779

(22) Filed: Oct. 27, 2022

(65) Prior Publication Data
US 2023/0138181 A1   May 4, 2023

Related U.S. Application Data

(63) Continuation of application No. PCT/CN2020/087603, filed on Apr. 28, 2020.

(51) Int. Cl.
*G01S 5/00* (2006.01)
*H04W 64/00* (2009.01)

(52) U.S. Cl.
CPC .......... *G01S 5/0036* (2013.01); *G01S 5/0027* (2013.01); *H04W 64/00* (2013.01)

(58) Field of Classification Search
CPC .... G01S 5/0009; G01S 5/0027; G01S 5/0036; G01S 5/0247; G01S 5/0268; G16Y 20/10; H04W 64/00; H04W 84/005
See application file for complete search history.

(56) References Cited

U.S. PATENT DOCUMENTS

| | | | |
|---|---|---|---|
| 7,336,961 B1 * | 2/2008 | Ngan | H04W 64/00 455/562.1 |
| 8,195,190 B1 * | 6/2012 | Hou | H04W 64/00 455/432.2 |

(Continued)

FOREIGN PATENT DOCUMENTS

| | | |
|---|---|---|
| CN | 105589506 A | 5/2016 |
| CN | 107315164 A | 11/2017 |

(Continued)

OTHER PUBLICATIONS

3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, 107 pages.

*Primary Examiner* — Dung B Huynh
(74) *Attorney, Agent, or Firm* — Maier & Maier, PLLC

(57) ABSTRACT

A positioning management device receives first information sent by a terminal device, where the first information includes a plurality of antenna identifiers of the terminal device and local antenna coordinates corresponding to each antenna identifier. The positioning management device receives measurement information sent by the terminal device, where the measurement information includes the plurality of antenna identifiers of the terminal device and a measurement result that is of a downlink reference signal and that corresponds to each antenna identifier. The positioning management device determines positioning information of the terminal device based on the first information and the measurement information, where the positioning information includes one or more of the following information: absolute coordinates of the terminal device, orientation or posture information of the terminal device, a rotation angle (Continued)

of the terminal device, or uptilt and downtilt angles of the terminal device.

17 Claims, 14 Drawing Sheets

(56) References Cited

U.S. PATENT DOCUMENTS

| | | | | |
|---|---|---|---|---|
| 8,315,617 B2* | 11/2012 | Tadayon | H04W 4/025 |
| | | | 455/418 |
| 8,718,634 B2* | 5/2014 | Fodor | G01S 5/0036 |
| | | | 455/420 |
| 9,118,103 B1* | 8/2015 | Banerjea | G01S 1/0423 |
| 9,622,207 B1* | 4/2017 | Pon | G01S 1/20 |
| 10,726,631 B1* | 7/2020 | Ha | G06T 7/73 |
| 10,958,325 B1* | 3/2021 | Park | H04W 88/02 |
| 11,223,430 B2* | 1/2022 | Kurras | G01S 5/08 |
| 11,895,613 B2* | 2/2024 | Schaepperle | H04W 64/00 |
| 12,146,974 B2* | 11/2024 | Baek | H04L 5/0033 |
| 2002/0077116 A1* | 6/2002 | Havinis | H04W 4/02 |
| | | | 455/457 |
| 2004/0102196 A1* | 5/2004 | Weckstrom | H04W 64/00 |
| | | | 455/456.2 |
| 2005/0037775 A1* | 2/2005 | Moeglein | G01S 19/13 |
| | | | 455/456.1 |
| 2005/0078626 A1* | 4/2005 | Ogino | H04W 64/00 |
| | | | 455/426.2 |
| 2005/0208952 A1* | 9/2005 | Dietrich | G01S 5/02528 |
| | | | 455/456.3 |
| 2007/0296633 A1* | 12/2007 | Yanagihara | G01S 5/0289 |
| | | | 342/463 |
| 2009/0323586 A1* | 12/2009 | Hohl | G06F 3/0354 |
| | | | 370/328 |
| 2010/0144367 A1* | 6/2010 | Goh | G01S 5/0294 |
| | | | 455/456.1 |
| 2010/0273504 A1* | 10/2010 | Bull | H04K 3/65 |
| | | | 455/456.1 |
| 2012/0231809 A1* | 9/2012 | Siomina | H04W 64/00 |
| | | | 455/456.1 |
| 2012/0309336 A1* | 12/2012 | Tanaka | G01S 11/06 |
| | | | 455/226.2 |
| 2013/0040682 A1* | 2/2013 | Chang | H04L 67/306 |
| | | | 342/368 |
| 2013/0252629 A1* | 9/2013 | Wigren | H04W 64/00 |
| | | | 455/456.1 |
| 2014/0141799 A1* | 5/2014 | Rousu | G01S 19/235 |
| | | | 455/456.1 |
| 2014/0221005 A1* | 8/2014 | Marshall | G01S 5/021 |
| | | | 455/456.1 |
| 2014/0295880 A1* | 10/2014 | Ranki | H04W 4/029 |
| | | | 455/456.1 |
| 2014/0295881 A1* | 10/2014 | Werner | G01S 5/0236 |
| | | | 455/456.1 |
| 2015/0031345 A1* | 1/2015 | Hyde | H04L 41/0803 |
| | | | 455/418 |
| 2015/0032304 A1* | 1/2015 | Nakamura | G01S 3/143 |
| | | | 342/442 |
| 2015/0061830 A1* | 3/2015 | Yamane | G07C 9/00182 |
| | | | 340/5.64 |
| 2015/0173038 A1* | 6/2015 | Quan | H04W 64/00 |
| | | | 455/456.5 |
| 2015/0341804 A1* | 11/2015 | Syrjarinne | H01Q 3/267 |
| | | | 370/252 |
| 2015/0350850 A1* | 12/2015 | Edge | H04W 88/02 |
| | | | 455/456.1 |
| 2016/0112173 A1* | 4/2016 | Wang | H04B 7/04 |
| | | | 370/329 |
| 2016/0255463 A1* | 9/2016 | Das | G01S 5/0236 |
| | | | 455/456.1 |
| 2016/0255471 A1* | 9/2016 | Marri Sridhar | H04B 17/318 |
| | | | 455/456.2 |
| 2016/0255604 A1* | 9/2016 | Venkatraman | G01S 5/02524 |
| | | | 455/456.1 |
| 2016/0286359 A1* | 9/2016 | Maytal | H04W 64/00 |
| 2016/0360370 A1* | 12/2016 | Edge | H04W 64/00 |
| 2017/0006575 A1* | 1/2017 | Cui | G01S 5/0036 |
| 2017/0289831 A1* | 10/2017 | Park | G01S 5/02 |
| 2017/0339236 A1* | 11/2017 | Kim | G01S 11/06 |
| 2017/0373743 A1* | 12/2017 | Park | H04L 25/0224 |
| 2018/0017661 A1* | 1/2018 | Morioka | H04W 4/029 |
| 2018/0049153 A1* | 2/2018 | Sheynblat | G01S 5/0236 |
| 2018/0115357 A1* | 4/2018 | Park | H04W 72/00 |
| 2018/0167775 A1* | 6/2018 | Tian | H04W 8/005 |
| 2018/0270783 A1* | 9/2018 | Venkatraman | G01S 5/0247 |
| 2018/0284149 A1* | 10/2018 | Kommi | G01S 5/0264 |
| 2018/0306896 A1* | 10/2018 | Xue | H04L 1/0026 |
| 2019/0037350 A1* | 1/2019 | Prevatt | G01S 5/0263 |
| 2019/0132031 A1 | 5/2019 | Park et al. |
| 2019/0146052 A1* | 5/2019 | Chiu | H04B 7/024 |
| | | | 342/146 |
| 2019/0213368 A1* | 7/2019 | White | G06K 7/10445 |
| 2019/0221110 A1* | 7/2019 | Vanderveen | G01S 5/0072 |
| 2019/0285722 A1* | 9/2019 | Markhovsky | G01S 1/042 |
| 2019/0342874 A1* | 11/2019 | Davydov | H04W 72/23 |
| 2019/0380056 A1* | 12/2019 | Lee | H04B 7/0695 |
| 2020/0142023 A1* | 5/2020 | Markhovsky | G01S 5/0218 |
| 2020/0182959 A1* | 6/2020 | Markhovsky | G01S 19/05 |
| 2020/0228916 A1* | 7/2020 | Smith | G01S 5/0284 |
| 2020/0267681 A1* | 8/2020 | Ferrari | H04W 64/00 |
| 2020/0275236 A1* | 8/2020 | Gangakhedkar | H04W 4/025 |
| 2020/0280830 A1* | 9/2020 | Stirling-Gallacher | |
| | | | H04B 1/3822 |
| 2020/0296551 A1* | 9/2020 | Manolakos | H04W 24/08 |
| 2021/0160718 A1* | 5/2021 | Yum | H04W 24/10 |
| 2021/0185637 A1* | 6/2021 | Agarwal | H04W 48/16 |
| 2021/0219103 A1* | 7/2021 | Wang | G01S 5/0236 |
| 2021/0250892 A1* | 8/2021 | Kim | H04L 5/0048 |
| 2021/0281297 A1* | 9/2021 | Karjalainen | H01Q 21/28 |
| 2021/0306895 A1* | 9/2021 | Chen | G01S 5/0236 |
| 2021/0314734 A1* | 10/2021 | Mehta | G01S 19/428 |
| 2021/0328747 A1* | 10/2021 | Da | H04L 5/0058 |
| 2021/0336737 A1* | 10/2021 | Li | H04L 5/0051 |
| 2021/0337531 A1* | 10/2021 | Manolakos | H04L 5/0048 |
| 2021/0368470 A1* | 11/2021 | Schaepperle | H04W 64/00 |
| 2021/0377975 A1* | 12/2021 | Yu | H04L 5/0048 |
| 2021/0409967 A1* | 12/2021 | Franke | H04W 16/28 |
| 2022/0007325 A1* | 1/2022 | Qi | G01S 5/12 |
| 2022/0014329 A1* | 1/2022 | Qi | H04W 72/046 |
| 2022/0099785 A1* | 3/2022 | Priyanto | G01S 5/0244 |
| 2022/0103322 A1* | 3/2022 | Qian | H04B 7/0426 |
| 2022/0113365 A1* | 4/2022 | Sosnin | G01S 5/02 |
| 2022/0116089 A1* | 4/2022 | Khoryaev | H04W 64/00 |
| 2022/0132463 A1* | 4/2022 | Cha | H04B 17/27 |
| 2022/0150866 A1* | 5/2022 | Ren | H04B 7/0617 |
| 2022/0191815 A1* | 6/2022 | Berggren | H04W 64/006 |
| 2022/0217503 A1* | 7/2022 | Guo | G01S 5/0268 |
| 2022/0217697 A1* | 7/2022 | Lee | H04W 72/20 |
| 2022/0236404 A1* | 7/2022 | Gunnarsson | G01S 13/765 |
| 2022/0278719 A1* | 9/2022 | Li | H04W 4/40 |
| 2022/0279313 A1* | 9/2022 | Huang | H04L 5/0094 |
| 2022/0291324 A1* | 9/2022 | Chen | H04W 4/029 |
| 2022/0312342 A1* | 9/2022 | Cha | H04L 5/0053 |
| 2022/0322105 A1* | 10/2022 | Ren | H04B 17/309 |
| 2022/0386267 A1* | 12/2022 | Zhang | H04W 4/029 |
| 2023/0080333 A1* | 3/2023 | Li | H04B 7/0802 |
| | | | 375/267 |
| 2023/0232365 A1* | 7/2023 | Sahlin | G01S 5/0009 |
| | | | 455/456.1 |
| 2023/0362661 A1* | 11/2023 | Thyni | H04W 16/18 |
| 2024/0142564 A1* | 5/2024 | Manolakos | G01S 5/0268 |
| 2024/0151806 A1* | 5/2024 | Ivanov | G01S 5/02523 |
| 2025/0016722 A1* | 1/2025 | Duan | G01S 5/04 |
| 2025/0130305 A1* | 4/2025 | Peng | H04L 5/0092 |

FOREIGN PATENT DOCUMENTS

| | | |
|---|---|---|
| CN | 109462886 A | 3/2019 |
| CN | 110366243 A | 10/2019 |
| CN | 110794366 A | 2/2020 |

(56) References Cited

FOREIGN PATENT DOCUMENTS

| | | | |
|---|---|---|---|
| EP | 4027717 | A1 | 7/2022 |
| JP | 2007306540 | A | 11/2007 |
| WO | 2015060883 | A1 | 4/2015 |
| WO | 2018234526 | A1 | 12/2018 |
| WO | 2019027595 | A1 | 2/2019 |
| WO | 2020063541 | A1 | 4/2020 |

\* cited by examiner

CONT.
FROM
FIG. 14A

CONT.
FROM
FIG. 14A

CONT.
FROM
FIG. 14A

1407. Send measurement information to the positioning management device, where the measurement information includes indexes of the plurality of uplink reference signal resources and/or resource sets and a measurement result corresponding to the index of each uplink reference signal resource and/or resource set 1408. Determine positioning information of the terminal device based on the first information and the measurement information, where the positioning information includes one or more of the following information: absolute coordinates of the terminal device, orientation or posture information of the terminal device, a rotation angle of the terminal device, or uptilt and downtilt angles of the terminal device

FIG. 14B

POSITIONING INFORMATION DETERMINING METHOD AND COMMUNICATION APPARATUS

CROSS-REFERENCE TO RELATED APPLICATIONS

This application is a continuation of International Application No. PCT/CN2020/087603, filed on Apr. 28, 2020, the disclosure of which is hereby incorporated by reference in its entirety.

FIELD

The embodiments relate to the field of communications technologies, a positioning information determining method, and a communication apparatus.

BACKGROUND

In an existing positioning method, a positioning device uses all antennas of a terminal device as one mass point at a same location for positioning and uses a determined antenna location as a location of the terminal device. When the positioning precision is at a level of several meters, the size of the terminal device is small relative to the positioning precision, all the antennas of the terminal device may be used as one mass point for positioning, and a distance between a plurality of antennas of the terminal device may be ignored in such positioning precision.

However, in the IIoT industrial internet of things (IIoT) of 3GPP Rel-17, the positioning precision of the terminal device is required to be less than 0.2 m (meter), in other words, a positioning error of the terminal device should be less than 0.2 m. In an industrial internet of things scenario, the size of a terminal device (for example, an automatic vehicle or an automatic cargo ship) and a distance between a plurality of antennas of the terminal device are usually greater than the positioning precision. In this scenario, if all the antennas of the terminal device are considered as one mass point for positioning, an approximation error of determined location information of the terminal device is large. In addition, if all the antennas of the terminal device are considered as one mass point, information such as an orientation or a posture of the terminal device cannot be determined. Therefore, how to accurately determine positioning information (such as location information, orientation information, or posture information) of a terminal device is an urgent problem to be resolved in 5G and a next-generation mobile communication system of 5G.

SUMMARY

The embodiments may provide a positioning information determining method and a communication apparatus, to help a positioning device accurately determine positioning information of a terminal device.

According to a first aspect, the embodiments may provide a positioning information determining method. The method includes: A positioning management device receives first information sent by a terminal device, where the first information includes a plurality of antenna identifiers of the terminal device and local antenna coordinates corresponding to each antenna identifier. The positioning management device receives measurement information sent by the terminal device, where the measurement information includes the plurality of antenna identifiers of the terminal device and a measurement result that is of a downlink reference signal and that corresponds to each antenna identifier. The positioning management device determines positioning information of the terminal device based on the first information and the measurement information, where the positioning information includes one or more of the following information: absolute coordinates of the terminal device, orientation or posture information of the terminal device, a rotation angle of the terminal device, or uptilt and downtilt angles of the terminal device.

Based on the method described in the first aspect, the positioning management device may determine the positioning information of the terminal device with reference to the first information and measurement results corresponding to the plurality of antenna identifiers. This helps improve the precision of determining the positioning information of the terminal device. In addition, in the method described in the first aspect, the positioning information of the terminal device may alternatively be determined by sending a downlink reference signal by one access network device. This helps reduce an environment deployment condition for determining a location, an orientation, or a posture of the terminal device.

In a possible implementation, the first information further includes local coordinates of a reference point of the terminal device and/or an antenna identifier that is of the terminal device and that corresponds to the reference point, and the absolute coordinates of the terminal device are absolute coordinates of the reference point of the terminal device. By implementing this possible implementation, after obtaining the local coordinates of the reference point of the terminal device and/or the antenna identifier that is of the terminal device and that corresponds to the reference point, the positioning management device may determine the absolute coordinates of the reference point of the terminal device based on the local coordinates of the reference point of the terminal device and/or the antenna identifier that is of the terminal device and that corresponds to the reference point, and further determine the absolute coordinates of the terminal device.

In a possible implementation, an implementation in which the positioning management device receives the first information sent by the terminal device is: The positioning management device receives a positioning capability message of the terminal device sent by the terminal device, where the positioning capability message of the terminal device carries the first information, and the positioning capability message indicates that the terminal device has a capability of determining the positioning information by using a plurality of antennas. By implementing this possible implementation, the positioning management device can obtain the positioning capability message of the terminal device in time. In this way, the positioning management device can subsequently determine whether positioning can be performed by using a multi-antenna positioning algorithm. In addition, the first information is included in the positioning capability message and sent to the positioning management device, so that the positioning management device can know earlier information such as the antenna identifier of the terminal device and the local antenna coordinates corresponding to the antenna identifier.

In a possible implementation, after the positioning management device receives the positioning capability message of the terminal device sent by the terminal device, and before the positioning management device receives the measurement information sent by the terminal device, the positioning management device may further send a report request to the terminal device, where the report request requests to report the measurement information. Optionally, the positioning management device may send the report request to the terminal device based on a service positioning precision requirement of the terminal device. By implementing this possible implementation, the positioning management device may flexibly obtain required measurement information from the terminal device based on a positioning requirement.

In a possible implementation, before receiving the measurement information sent by the terminal device, the positioning management device may alternatively receive a positioning capability message of the terminal device sent by the terminal device, where the positioning capability message indicates that the terminal device has a capability of determining the positioning information by using a plurality of antennas. By implementing this possible implementation, the positioning management device can obtain the positioning capability message of the terminal device in time. In this way, the positioning management device can subsequently determine whether positioning can be performed by using a multi-antenna positioning algorithm.

In a possible implementation, after receiving the positioning capability message of the terminal device sent by the terminal device, the positioning management device may further send a report request to the terminal device, where the report request requests to report the measurement information and the first information. Based on this possible implementation, the positioning management device may flexibly obtain required measurement information from the terminal device based on a positioning requirement. In addition, the terminal device needs to report the first information only when the positioning management device needs to use the multi-antenna positioning algorithm. This helps save communication resources.

In a possible implementation, the absolute coordinates of the terminal device are the absolute coordinates of the reference point of the terminal device, the reference point is not an antenna of the terminal device, and that the positioning management device determines absolute coordinates of the terminal device based on the first information and the measurement information includes: The positioning management device determines absolute coordinates corresponding to the antenna identifier based on the measurement information, the antenna identifier in the first information, and the local antenna coordinates of the antenna identifier; and the positioning management device determines the absolute coordinates of the reference point based on the absolute coordinates corresponding to the antenna identifier, the local antenna coordinates corresponding to the antenna identifier, and the local coordinates of the reference point. Based on this possible implementation, the absolute coordinates of the terminal device can be accurately determined.

In a possible implementation, the absolute coordinates of the terminal device are the absolute coordinates of the reference point of the terminal device, the reference point is an antenna of the terminal device, the measurement information includes a measurement result corresponding to the reference point, and that the positioning management device determines absolute coordinates of the terminal device based on the first information and the measurement information includes: The positioning management device determines absolute coordinates corresponding to the antenna identifier and the absolute coordinates of the reference point based on the measurement information, the local coordinates of the reference point, the antenna identifier in the first information, and the local antenna coordinates of the antenna identifier. Based on this possible implementation, the absolute coordinates of the terminal device can be accurately determined.

In a possible implementation, an implementation in which the positioning management device determines the orientation or posture information of the terminal device, the rotation angle, and/or the uptilt and downtilt angles of the terminal device based on antenna information and the measurement information is: The positioning management device determines an absolute location corresponding to the antenna identifier based on the measurement information, the antenna identifier in the first information, and the local antenna coordinates of the antenna identifier; and the positioning management device determines the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier. Based on this possible implementation, the orientation or posture information of the terminal device, the rotation angle, and/or the uptilt and downtilt angles of the terminal device can be accurately determined.

According to a second aspect, the embodiments may provide a positioning information determining method. The method includes: A terminal device sends first information to a positioning management device, where the first information includes a plurality of antenna identifiers of the terminal device and local antenna coordinates corresponding to each antenna identifier. The terminal device measures, by using antennas corresponding to the plurality of antenna identifiers, downlink reference signals sent by an access network device. The terminal device sends measurement information to the positioning management device, where the measurement information includes the plurality of antenna identifiers of the terminal device and a measurement result that is of a downlink reference signal and that corresponds to each antenna identifier.

In a possible implementation, the first information further includes local coordinates of a reference point of the terminal device and/or an antenna identifier that is of the terminal device and that corresponds to the reference point, and absolute coordinates of the reference point of the terminal device are absolute coordinates of the terminal device.

In a possible implementation, an implementation in which the terminal device sends the first information to the positioning management device is: The terminal device sends a positioning capability message of the terminal device to the positioning management device, where the positioning capability message of the terminal device carries the first information, and the positioning capability message indicates that the terminal device has a capability of determining positioning information by using a plurality of antennas.

In a possible implementation, after the terminal device sends the positioning capability message of the terminal device to the positioning management device, and before the terminal device measures, by using the antennas corresponding to the plurality of antenna identifiers, the downlink reference signals sent by the access network device, the terminal device may further receive a report request sent by the positioning management device, where the report request requests to report the measurement information.

In a possible implementation, before measuring, by using the antennas corresponding to the plurality of antenna identifiers, the downlink reference signals sent by the access network device, the terminal device may further send a positioning capability message of the terminal device to the positioning management device, where the positioning capability message indicates that the terminal device has a capability of determining positioning information by using a plurality of antennas.

In a possible implementation, after sending the positioning capability message of the terminal device to the positioning management device, the terminal device may further receive a report request sent by the positioning management device, where the report request requests to report the measurement information and the first information.

For beneficial effects of the second aspect, refer to the beneficial effects of the first aspect. Details are not described herein.

According to a third aspect, the embodiments may provide a positioning information determining method. The method includes: A positioning management device receives first information sent by a terminal device, where the first information includes a plurality of antenna identifiers of the terminal device and local antenna coordinates corresponding to each antenna identifier. The positioning management device receives measurement information sent by an access network device, where the measurement information includes indexes of a plurality of uplink reference signal resources and/or resource sets and a measurement result corresponding to the index of each uplink reference signal resource and/or resource set. The positioning management device determines positioning information of the terminal device based on the first information and the measurement information, where the positioning information includes one or more of the following information: absolute coordinates of the terminal device, orientation or posture information of the terminal device, a rotation angle of the terminal device, and uptilt and downtilt angles of the terminal device. According to the method described in the third aspect, the precision of determining the positioning information of the terminal device can be improved. In addition, in the method described in the third aspect, the positioning information of the terminal device may alternatively be determined by receiving an uplink reference signal by one access network device. This helps reduce an environment deployment condition for determining a location, an orientation, or a posture of the terminal device.

In a possible implementation, the first information further includes local coordinates of a reference point of the terminal device and/or an antenna identifier that is of the terminal device and that corresponds to the reference point, and the absolute coordinates of the terminal device are absolute coordinates of the reference point of the terminal device. By implementing this possible implementation, after obtaining the local coordinates of the reference point of the terminal device and/or the antenna identifier that is of the terminal device and that corresponds to the reference point, the positioning management device may determine the absolute coordinates of the reference point of the terminal device based on the local coordinates of the reference point of the terminal device and/or the antenna identifier that is of the terminal device and that corresponds to the reference point, and further determine the absolute coordinates of the terminal device.

In a possible implementation, before receiving the measurement information sent by the access network device, the positioning management device may further receive a positioning capability message of the terminal device sent by the terminal device, where the positioning capability message of the terminal device carries the first information, and the positioning capability message indicates that the terminal device has a capability of determining the positioning information by using a plurality of antennas. By implementing this possible implementation, the positioning management device can obtain the positioning capability message of the terminal device in time. In this way, the positioning management device can subsequently determine whether positioning can be performed by using a multi-antenna positioning algorithm. In addition, the first information is included in the positioning capability message and sent to the positioning management device, so that the positioning management device can know earlier information such as the antenna identifier of the terminal device and the local antenna coordinates corresponding to the antenna identifier.

In a possible implementation, before determining the positioning information of the terminal device based on the first information and the measurement information, the positioning management device may further receive a plurality of pieces of first configuration information sent by a serving cell of the terminal device, where the plurality of pieces of first configuration information is used to configure the plurality of uplink reference signal resources and/or resource sets, and each piece of first configuration information includes the index of the uplink reference signal resource and/or resource set and an antenna identifier that is of the terminal device and that corresponds to the uplink reference signal resource and/or resource set. The positioning management device sends second configuration information of the plurality of uplink reference signal resources and/or resource sets to the access network device, where each piece of the second configuration information includes the index of the uplink reference signal resource and/or resource set. Based on this possible implementation, an antenna for sending an uplink reference signal on an uplink reference signal resource or resource set can be required or recommended to the terminal device.

In a possible implementation, the positioning management device sends the first configuration information of the plurality of uplink reference signal resources and/or resource sets to the terminal device. Based on this possible implementation, an antenna for sending an uplink reference signal on an uplink reference signal resource or resource set can be required or recommended to the terminal device.

In a possible implementation, before determining the positioning information of the terminal device based on the first information and the measurement information, the positioning management device may further generate a plurality of pieces of first configuration information, where the plurality of pieces of first configuration information is used to configure the plurality of uplink reference signal resources and/or resource sets, and each piece of first configuration information includes the index of the uplink reference signal resource and/or resource set and an antenna identifier that is of the terminal device and that corresponds to the uplink reference signal resource and/or resource set. The positioning management device sends second configuration information of the plurality of uplink reference signal resources and/or resource sets to the access network device, where each piece of the second configuration information includes the index of the uplink reference signal resource and/or resource set. The positioning management device sends the first configuration information of the plurality of uplink reference signal resources and/or resource sets to the terminal device. Based on this possible implementation, an antenna for sending an uplink reference signal on an uplink reference signal resource or resource set can be required or recommended to the terminal device.

In a possible implementation, an implementation in which the positioning management device determines the positioning information of the terminal device based on the first information and the measurement information is: The positioning management device determines an antenna identifier that is of the terminal device and that corresponds to each measurement result based on the plurality of pieces of first configuration information and the index that is of the uplink reference signal resource and/or resource set and that corresponds to each measurement result. The positioning management device determines the positioning information of the terminal device based on the first information, each measurement result, and the antenna identifier that is of the terminal device and that corresponds to each measurement result. Based on this possible implementation, the antenna identifier that is of the terminal device and that corresponds to each measurement result can be accurately determined.

In a possible implementation, the positioning management device receives second information reported by the terminal device, where the second information includes the index that is of the uplink reference signal resource or resource set and that is sent by the terminal device, and the antenna identifier that is of the terminal device, that corresponds to the uplink reference signal resource and/or resource set, and that is sent by the terminal device; and an implementation in which the positioning management device determines the positioning information of the terminal device based on the first information and the measurement information is: The positioning management device determines an antenna identifier that is of the terminal device and that corresponds to each measurement result based on the second information and the index that is of the uplink reference signal resource and/or resource set that corresponds to each measurement result; and the positioning management device determines the positioning information of the terminal device based on the first information, each measurement result, and the antenna identifier that is of the terminal device and that corresponds to each measurement result. Based on this possible implementation, the antenna identifier that is of the terminal device and that corresponds to each measurement result can be accurately determined.

In a possible implementation, the absolute coordinates of the terminal device are the absolute coordinates of the reference point of the terminal device, the reference point is not an antenna of the terminal device, and an implementation in which the positioning management device determines the absolute coordinates of the terminal device based on the first information, each measurement result, and the antenna identifier that is of the terminal device and that corresponds to each measurement result is: The positioning management device determines an absolute location corresponding to the antenna identifier based on each measurement result, the antenna identifier that is of the terminal device and that corresponds to each measurement result, the antenna identifier in the first information, and the local antenna coordinates of the antenna identifier; and the positioning management device determines the absolute coordinates of the reference point based on the absolute location corresponding to the antenna identifier, the local antenna coordinates corresponding to the antenna identifier, and the local coordinates of the reference point. Based on this possible implementation, the absolute coordinates of the terminal device can be accurately determined.

In a possible implementation, the absolute coordinates of the terminal device are the absolute coordinates of the reference point of the terminal device, the reference point is an antenna of the terminal device, the measurement information includes a measurement result corresponding to the reference point, and an implementation in which the positioning management device determines the absolute coordinates of the terminal device based on the first information, each measurement result, and the antenna identifier that is of the terminal device and that corresponds to each measurement result is: The positioning management device determines absolute coordinates corresponding to the antenna identifier and the absolute coordinates of the reference point based on each measurement result, the antenna identifier that is of the terminal device and that corresponds to each measurement result, the local coordinates of the reference point, the antenna identifier in the first information, and the local antenna coordinates of the antenna identifier. Based on this possible implementation, the absolute coordinates of the terminal device can be accurately determined.

In a possible implementation, an implementation in which the positioning management device determines the orientation or posture information of the terminal device, the rotation angle, and/or the uptilt and downtilt angles of the terminal device based on the first information, the plurality of measurement results, and the antenna identifier that is of the terminal device and that corresponds to each measurement result is: The positioning management device determines an absolute location corresponding to the antenna identifier based on each measurement result, the antenna identifier that is of the terminal device and that corresponds to each measurement result, the antenna identifier in the first information, and the local antenna coordinates of the antenna identifier; and the positioning management device determines the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier. Based on this possible implementation, the orientation or posture information of the terminal device, the rotation angle, and/or the uptilt and downtilt angles of the terminal device can be accurately determined.

According to a fourth aspect, the embodiments may provide a positioning information determining method. The method includes: A terminal device sends first information to a positioning management device, where the first information includes a plurality of antenna identifiers of the terminal device and local antenna coordinates corresponding to each antenna identifier. The terminal device sends uplink reference signals to an access network device by using antennas corresponding to the plurality of antenna identifiers.

In a possible implementation, the first information further includes local coordinates of a reference point of the terminal device and/or an antenna identifier that is of the terminal device and that corresponds to the reference point, and absolute coordinates of the reference point of the terminal device are absolute coordinates of the terminal device.

In a possible implementation, an implementation in which the terminal device sends the first information to the positioning management device is: The terminal device sends a positioning capability message of the terminal device to the positioning management device, where the positioning capability message of the terminal device carries the first information, and the positioning capability message indicates that the terminal device has a capability of determining the positioning information by using a plurality of antennas.

In a possible implementation, after the terminal device sends the first information to the positioning management device, and before the terminal device sends the uplink reference signals to the access network device by using the antennas corresponding to the plurality of antenna identifiers, the terminal device may further receive a plurality of pieces of first configuration information sent by a serving cell of the terminal device or the positioning management device, where the plurality of pieces of first configuration information is used to configure a plurality of uplink reference signal resources and/or resource sets, and each piece of first configuration information includes an index of the uplink reference signal resource and/or resource set and an antenna identifier that is of the terminal device and that corresponds to the uplink reference signal resource and/or resource set.

In a possible implementation, an implementation in which the terminal device sends the uplink reference signals to the access network device by using the antennas corresponding to the plurality of antenna identifiers is: The terminal device sends, based on the plurality of pieces of first configuration information, the uplink reference signals to the access network device on corresponding uplink reference signal resources and/or resource sets by using the antennas corresponding to the plurality of antenna identifiers.

In a possible implementation, after sending the uplink reference signals to the access network device by using the antennas corresponding to the plurality of antenna identifiers, the terminal device may further report second information to the positioning management device, where the second information includes an index that is of an uplink reference signal resource or resource set and that is sent by the terminal device, and an antenna identifier that is of the terminal device and that corresponds to the uplink reference signal resource and/or resource set sent by the terminal device.

For beneficial effects of the fourth aspect, refer to the beneficial effects of the third aspect. Details are not described herein again.

According to a fifth aspect, a communication apparatus is provided. The apparatus may be a positioning management device, may be an apparatus in the positioning management device, or may be an apparatus that can be used together with the positioning management device. The communication apparatus may alternatively be a chip system. The communication apparatus may perform the method according to the first aspect or the third aspect. A function of the communication apparatus may be implemented by hardware or may be implemented by hardware by executing corresponding software. The hardware or the software includes one or more units corresponding to the functions. The unit may be software and/or hardware. For operations performed by the communication apparatus and beneficial effects thereof, refer to the method in the first aspect or the third aspect, and beneficial effects thereof. Repeated content is not described again.

According to a sixth aspect, a communication apparatus is provided. The apparatus may be a terminal device, an apparatus in the terminal device, or an apparatus that can be used together with the terminal device. The communication apparatus may alternatively be a chip system. The communication apparatus may perform the method according to the second aspect or the fourth aspect. A function of the communication apparatus may be implemented by hardware or may be implemented by hardware by executing corresponding software. The hardware or the software includes one or more units corresponding to the functions. The unit may be software and/or hardware. For operations performed by the communication apparatus and beneficial effects thereof, refer to the method in the second aspect or the fourth aspect, and beneficial effects thereof. Repeated content is not described again.

According to a seventh aspect, the embodiments may provide a communication apparatus. The communication apparatus includes a processor. When the processor invokes a computer program in a memory, the method performed by the positioning management device in the method according to the first aspect or the third aspect is performed.

According to an eighth aspect, the embodiments may provide a communication apparatus. The communication apparatus includes a processor. When the processor invokes a computer program in a memory, the method performed by the terminal device in the method according to the second aspect or the fourth aspect is performed.

According to a ninth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the positioning management device according to the first aspect or the third aspect.

According to a tenth aspect, the embodiments may provide a communication apparatus. The communication apparatus includes a processor and a memory. The memory is configured to store computer-executable instructions. The processor is configured to execute the computer-executable instructions stored in the memory, to enable the communication apparatus to perform the method performed by the terminal device according to the second aspect or the fourth aspect.

According to an eleventh aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the positioning management device in the method according to the first aspect or the third aspect.

According to a twelfth aspect, the embodiments may provide a communication apparatus. The communication apparatus includes a processor, a memory, and a transceiver. The transceiver is configured to receive a signal or send a signal. The memory is configured to store a computer program. The processor is configured to invoke the computer program from the memory to perform the method performed by the terminal device in the method according to the second aspect or the fourth aspect.

According to a thirteenth aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the positioning management device in the method according to the first aspect or the third aspect.

According to a fourteenth aspect, the embodiments may provide a communication apparatus. The communication apparatus includes a processor and an interface circuit. The interface circuit is configured to receive computer-executable instructions and transmit the computer-executable instructions to the processor. The processor runs the computer-executable instructions to perform the method performed by the terminal device in the method according to the second aspect or the fourth aspect.

According to a fifteenth aspect, the embodiments may provide a computer-readable storage medium. The computer-readable storage medium is configured to store computer-executable instructions. When the computer-executable instructions are executed, the method performed by the positioning management device in the method according to the first aspect or the third aspect is implemented.

According to a sixteenth aspect, the embodiments may provide a non-transitory computer-readable storage medium. The non-transitory computer-readable storage medium is configured to store computer-executable instructions. When the computer-executable instructions are executed, the method performed by the terminal device in the method according to the second aspect or the fourth aspect is implemented.

According to a seventeenth aspect, the embodiments may provide a computer program product including a computer program. When the computer program is executed, the method performed by the positioning management device in the method according to the first aspect or the third aspect is implemented.

According to an eighteenth aspect, the embodiments may provide a computer program product including a computer program. When the computer program is executed, the method performed by the terminal device in the method according to the second aspect or the fourth aspect is implemented.

According to a nineteenth aspect, the embodiments may provide a communication system. The communication system includes the communication apparatus according to the fifth aspect, the seventh aspect, the ninth aspect, the eleventh aspect, or the thirteenth aspect, and the communication apparatus according to the sixth aspect, the eighth aspect, the tenth aspect, the twelfth aspect, or the fourteenth aspect.

BRIEF DESCRIPTION OF THE DRAWINGS

FIG. 14A and FIG. 14B are schematic flowcharts of another uplink positioning information determining method according to an embodiment;

DETAILED DESCRIPTION OF THE EMBODIMENTS

To make the objectives, solutions, and advantages of clearer, the following further describes the embodiments in detail with reference to the accompanying drawings.

In the embodiments and the accompanying drawings, the terms "first", "second", and the like are intended to distinguish between different objects but do not indicate a particular order. In addition, the terms "including," "having," and any other variants thereof are intended to cover a non-exclusive inclusion. For example, a process, a method, a system, a product, or a device that includes a series of operations or units is not limited to the listed operations or units, but optionally further includes an unlisted operation or unit, or optionally further includes another inherent operation or unit of the process, the method, the product, or the device.

An "embodiment" means that a particular characteristic, structure, or feature described with reference to embodiments may be included in at least one embodiment. The phrase shown in various locations may not necessarily refer to a same embodiment and is not an independent or optional embodiment exclusive from another embodiment. It is explicitly and implicitly understood by a person skilled in the art that embodiments may be combined with another embodiment.

"At least one (item)" means one or more, "a plurality of" means two or more, "at least two (items)" means two, three, or more, and "and/or" is used to describe a correspondence relationship between corresponding objects and indicates that there may be three relationships. For example, "A and/or B" may indicate that only A exists, only B exists, and both A and B exist, where A and B may be singular or plural. The character "/" generally represents an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a, b, and c, where a, b, and c may be singular or plural.

To better understand the solutions, the following first describes a system architecture.

The method provided in the embodiments may be applied to various communication systems, for example, an Internet of Things (IoT) system, a narrow band Internet of Things (NB-IoT) system, a long term evolution (LTE) system, a 5th-generation (5G) communication system, an LTE-5G hybrid architecture, a 5G new radio (NR) system, and a new communication system emerging in future communication development.

Figure 1:
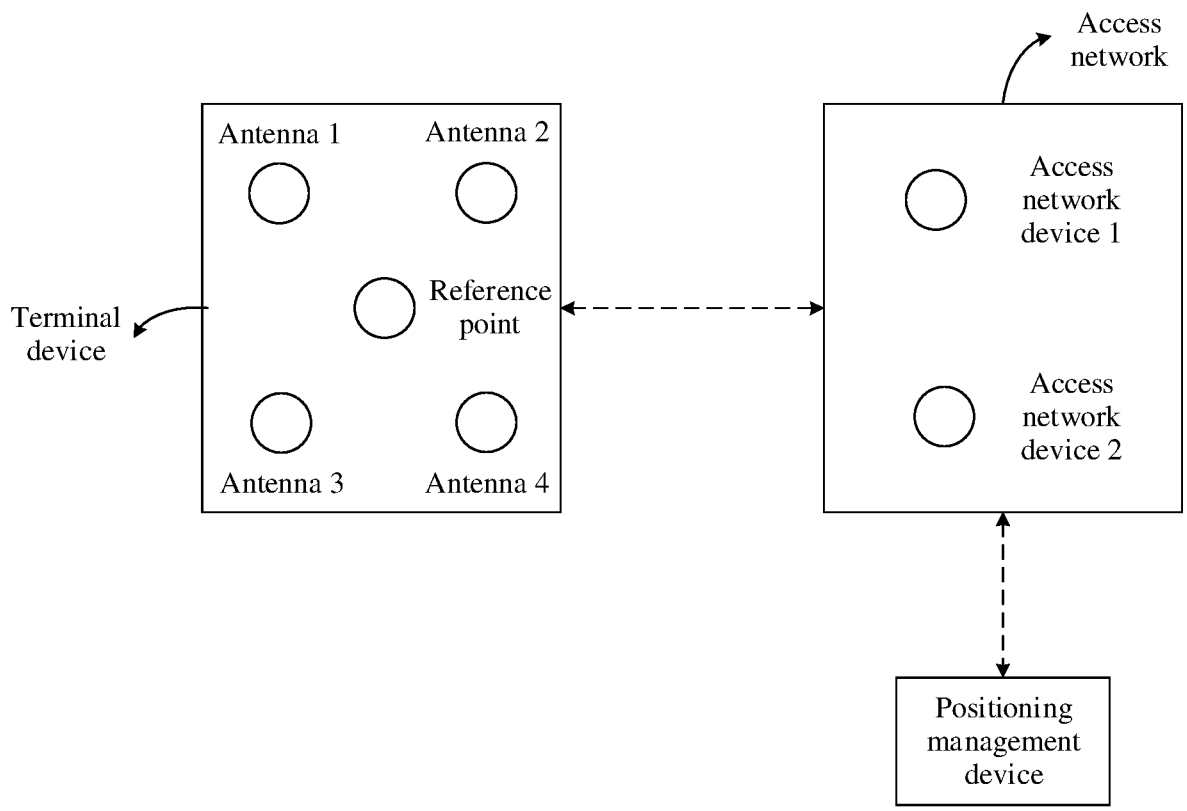
FIG. 1 is a schematic diagram of a system architecture according to an embodiment.

FIG. 1 is a schematic diagram of a system architecture according to an embodiment. As shown in FIG. 1, the system architecture includes a terminal device, an access network, and a positioning management device.

In this embodiment, the terminal device supports antennas corresponding to a plurality of antenna identifiers. One antenna identifier of the terminal device may identify one antenna or one group of antennas, in other words, one antenna identifier may correspond to one antenna or one group of antennas. For example, if an antenna 1 and an antenna 2 are deployed far away from each other on the terminal device, the antenna 1 and the antenna 2 may be identified by using different antenna identifiers. If the antenna 1 and the antenna 2 are deployed close to each other on the terminal device, the antenna 1 and the antenna 2 may be considered as one antenna, and the antenna 1 and the antenna 2 are identified by using a same antenna identifier. FIG. 1 is described by using an example in which the terminal device supports an antenna 1 corresponding to an antenna identifier 1 to an antenna 4 corresponding to an antenna identifier 4.

The terminal device in the embodiments is a user-side entity configured to receive or transmit a signal. The terminal device may be a device that provides a user with voice and/or data connectivity, for example, a handheld device or a vehicle-mounted device having a wireless connection function. The terminal device may alternatively be another processing device connected to a wireless modem. The terminal device may communicate with a radio access network (RAN). The terminal device may also be referred to as a wireless terminal, a subscriber unit, a subscriber station, a mobile station, a mobile console, a remote station, an access point, a remote terminal, an access terminal, a user terminal, a user agent, a user device, user equipment (UE), or the like. The terminal device may be a mobile terminal, for example, a mobile phone (or referred to as a "cellular" phone), and a computer that has a mobile terminal. For example, the terminal device may be a portable, pocket-sized, handheld, computer built-in, or a vehicle-mounted mobile apparatus, which exchanges a voice and/or data with the radio access network. For example, the terminal device may alternatively be a device such as a personal communications service (PCS) phone, a cordless telephone set, a session initiation protocol (SIP) phone, a wireless local loop (WLL) station, or a personal digital assistant (PDA). Common terminal devices include, for example, a car, a drone, a mechanical arm, a mobile phone, a tablet computer, a notebook computer, a palmtop computer, a mobile internet device (MID), and a wearable device such as a smartwatch, a smart band, or a pedometer. However, the embodiments are not limited thereto.

The access network may include one or more access network devices. The access network device in the embodiments is an entity for transmitting or receiving a signal on a network side, may be configured to mutually convert a received over-the-air frame and an internet protocol (IP) packet, and serves as a router between a terminal device and a remaining part of an access network. The remaining part of the access network may include an IP network and the like. The access network device may further coordinate attribute management of an air interface. For example, the access network device may be an evolved NodeB (eNB) in LTE, may be a new radio (NR) controller, may be an ng-eNB, may be a gNodeB (gNB) in a 5G system, may be a centralized network element (unit), may be a new radio base station, may be a remote radio module, may be a micro base station, may be a relay, may be a distributed unit, may be a transmission reception point (TRP), a transmission point (TP), or any other radio access device. However, this is not limited in this embodiment.

The positioning management device is a device used by the network side to determine positioning information of the terminal device. The positioning management device may be a location management function (LMF) entity, an evolved serving mobile location center (E-SMLC), or another device that can be used to determine the positioning information of the terminal device.

In a possible implementation, the system architecture shown in FIG. 1 may further include another device. For example, an access management function (AMF) entity may further be included. The AMF entity is a control plane network function provided by the operator network and is responsible for access control and mobility management for accessing the operator network by the terminal device. For example, the access control and mobility management may include functions such as mobility status management, temporary user identity allocation, and user authentication and authorization. In the embodiments, only a network device that is closely related to the positioning information determining method is described, and details of another related network device are not described.

The embodiments may provide a downlink positioning information determining method and an uplink positioning information determining method. The downlink positioning information determining method means that the access network device sends a downlink reference signal to the terminal device. The terminal device measures the downlink reference signal and sends a measurement result to the positioning management device, so that the positioning management device determines the positioning information of the terminal device based on the measurement result. The uplink positioning information determining method includes: The terminal device sends an uplink reference signal to the access network device, and the access network device measures the uplink reference signal and sends a measurement result to the positioning management device. The positioning management device determines the positioning information of the terminal device based on the measurement result.

To better understand the solutions, the following describes related terms in the embodiments.

A reference signal (RS) is a pilot signal, and is a known signal sent by a transmit end to a receive end for channel estimation or channel sounding. Reference signals may be classified into uplink reference signals and downlink reference signals. For example, a reference signal sent by the terminal device to the access network device (such as a base station) on the network side is an uplink reference signal, and a reference signal sent by the access network device to the terminal device is a downlink reference signal.

A reference signal time difference of arrival (RSTD) is a measurement result obtained by the terminal device by measuring a downlink reference signal. The terminal device may report the measured RSTD to the positioning management device, and the positioning management device determines the positioning information of the terminal device based on the RSTD. Optionally, in the downlink positioning information determining method, the terminal device may measure the RSTD by using antennas corresponding to a plurality of antenna identifiers. An RSTD measured by an antenna corresponding to an antenna identifier of the terminal device is equal to $T_{uerx2}-T_{uerx1}$. $T_{uerx2}$ is start time at which the antenna corresponding to the antenna identifier receives a downlink reference signal b from an access network device 2. $T_{uerx1}$ is start time at which the antenna corresponding to the antenna identifier receives a downlink reference signal a from an access network device 1. The downlink reference signal a is a reference signal that is received by the antenna corresponding to the antenna identifier from the access network device 1 and that is closest to receiving start time of the downlink reference signal b. The access network device 1 is a reference device.

Figure 2:
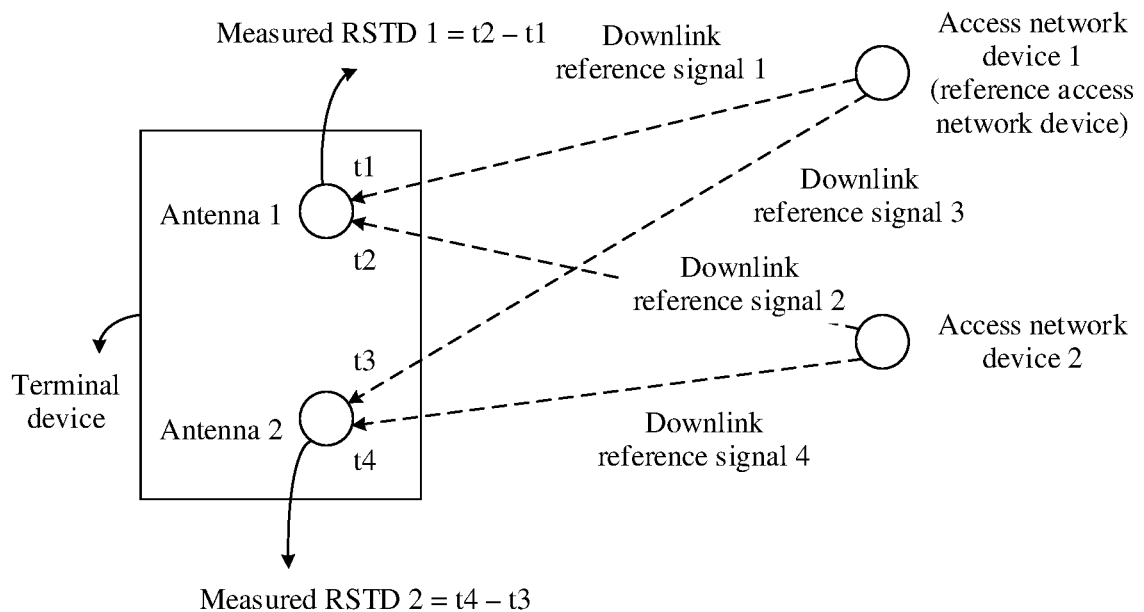
FIG. 2 is a schematic diagram of RSTD measurement according to an embodiment.

For example, as shown in FIG. 2, the terminal device has an antenna 1 corresponding to an antenna identifier 1 and an antenna 2 corresponding to an antenna identifier 2. The access network device 1 is a reference device. A start time at which the antenna 1 receives a downlink reference signal 2 from the access network device 2 is t2 and a start time at which the antenna 1 receives a downlink reference signal 1 from the access network device 1 is t1. The downlink reference signal 1 is a reference signal that is received by the antenna 1 from the access network device 1 and that is closest to receiving start time of the downlink reference signal 2. Therefore, an RSTD 1 measured by the antenna 1 is equal to t2-t1. Similarly, start time at which the antenna 2 receives a downlink reference signal 4 from the access network device 2 is t4, and start time at which the antenna 2 receives a downlink reference signal 3 from the access network device 1 is t3. The downlink reference signal 3 is a reference signal that is received by the antenna 2 from the access network device 1 and that is closest to receiving start time of the downlink reference signal 4. Therefore, an RSTD 2 measured by the antenna 2 is equal to t4-t3.

Figure 3:
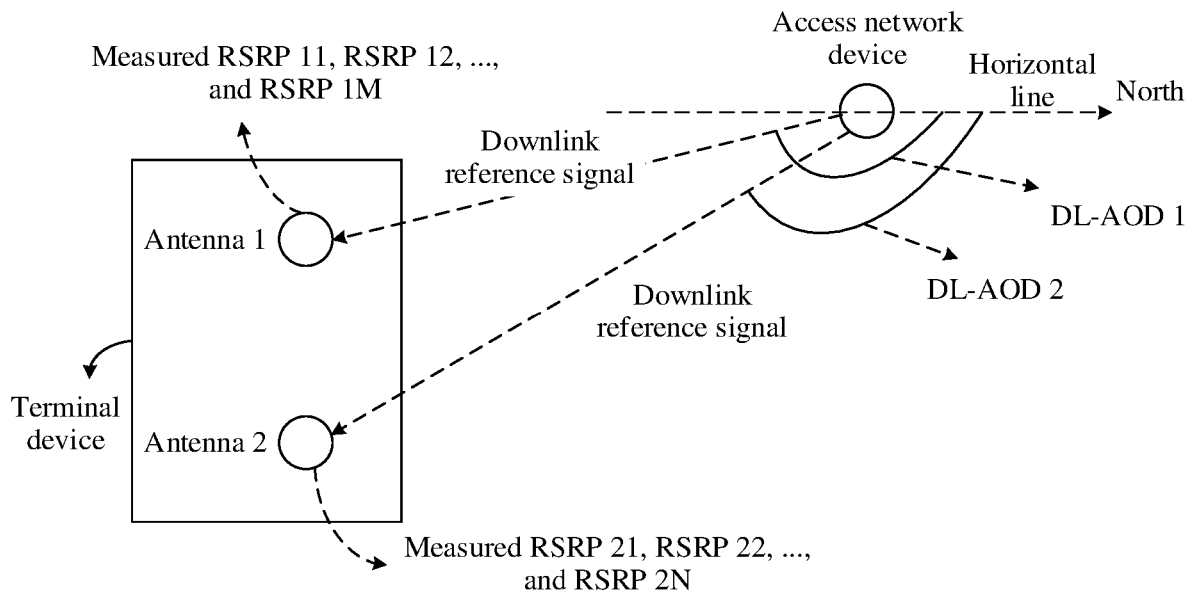
FIG. 3 is a schematic diagram of RSRP measurement according to an embodiment.

A reference signal received power (RSRP) is a measurement result obtained by the terminal device by measuring the downlink reference signal sent by the access network device. The terminal device may report the measured RSRP to the positioning management device. The positioning management device obtains a DL-AOD based on the RSRP and determines the positioning information of the terminal device based on the DL-AOD. The DL-AOD is an angle included between a direction (for example, a direction of a horizontal plane or a normal direction of the horizontal plane) and a reference signal sent by the access network device to an antenna of the terminal device when the reference signal leaves the access network device. Optionally, in the downlink positioning information determining method, the terminal device may measure the RSRP by using antennas corresponding to a plurality of antenna identifiers. For example, as shown in FIG. 3, the terminal device has an antenna 1 corresponding to an antenna identifier 1 and an antenna 2 corresponding to an antenna identifier 2. The antenna 1 measures one or more downlink reference signals sent by the access network device to obtain an RSRP 11, an RSRP 12, . . . , and an RSRP 1M. The antenna 2 measures the downlink reference signals sent by the access network device to obtain an RSRP 21, an RSRP 22, . . . , and an RSRP 2N. Herein, M may be equal to N, or may not be equal to N, where M≥1, and N≥1. After the terminal device reports the RSRP 11, the RSRP 12, . . . , and the RSRP 1M, and the RSRP 21, the RSRP 22, . . . , and the RSRP 2N to the positioning management device, the positioning management device may obtain a DL-AOD 1 based on the RSRP 11, the RSRP 12, . . . , and the RSRP 1M, and obtain a DL-AOD 2 based on the RSRP 21, the RSRP 22, . . . , and the RSRP 2N. The positioning management device may determine the positioning information of the terminal device based on the DL-AOD 1 and the DL-AOD 2.

A synchronization signal-reference signal received power (SS-RSRP)/Synchronization signal-reference signal received quality (SS-RSRQ)/Synchronization signal-signal to interference plus noise ratio (SS-SINR) is a measurement result obtained by the terminal device by measuring a downlink reference signal sent by the access network device. The terminal device may report the measured SS-RSRP/SS-RSRQ/SS-SINR to the positioning management device, and the positioning management device determines the positioning information of the terminal device based on the SS-RSRP/SS-RSRQ/SS-SINR. Optionally, in the downlink positioning information determining method, the terminal device may measure the SS-RSRP/SS-RSRQ/SS-SINR by using antennas corresponding to a plurality of antenna identifiers.

Figure 4:
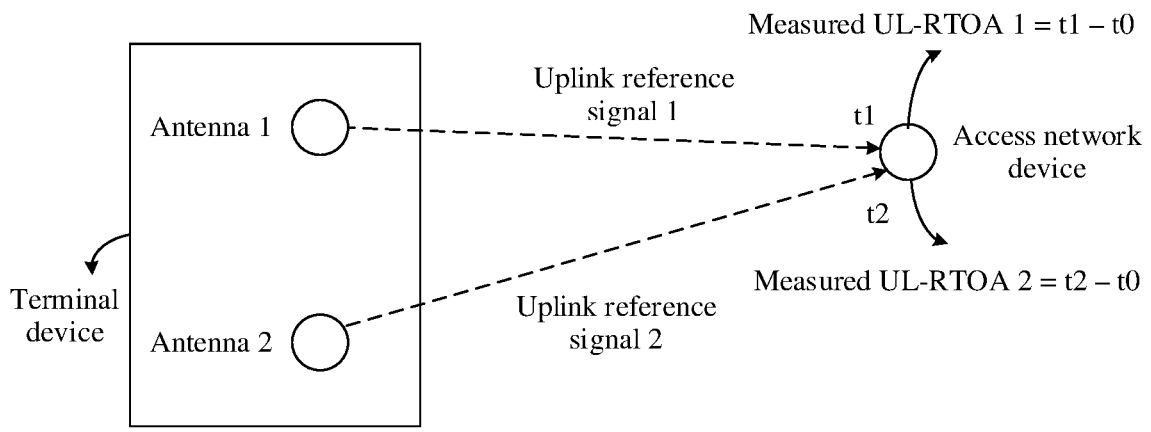
FIG. 4 is a schematic diagram of UL-RTOA measurement according to an embodiment.

Uplink relative time of arrival (UL-RTOA) is a measurement result obtained by the access network device by measuring an uplink reference signal sent by the terminal device. The access network device may report the UL-RTOA to the positioning management device, and the positioning management device determines the positioning information of the terminal device based on the UL-RTOA. Optionally, in the uplink positioning information determining method, the terminal device may send uplink reference signals by using antennas corresponding to a plurality of antenna identifiers. UL-RTOA obtained by the access network device by measuring an uplink reference signal sent by an antenna corresponding to an antenna identifier is equal to $T_{gnbrx1}-T_{reference}$. $T_{gnbrx1}$ is start time at which the access network device receives the uplink reference signal sent by the antenna. $T_{reference}$ is reference time of the access network device. For example, as shown in FIG. 4, the terminal device has an antenna 1 corresponding to an antenna identifier 1 and an antenna 2 corresponding to an antenna identifier 2. The antenna 1 sends an uplink reference signal 1. The antenna 2 sends an uplink reference signal 2. Start time at which the access network device receives the uplink reference signal 1 is t1, start time at which the access network device receives the uplink reference signal 2 is t2, and reference time of the access network device is t0. The access network device measures the uplink reference signal 1 sent by the antenna 1, to obtain a UL-RTOA 1, where the UL-RTOA 1=t1-t0. The access network device measures the uplink reference signal 2 sent by the antenna 2, to obtain a UL-RTOA 2, where the UL-RTOA 2=t2-t0.

Figure 5:
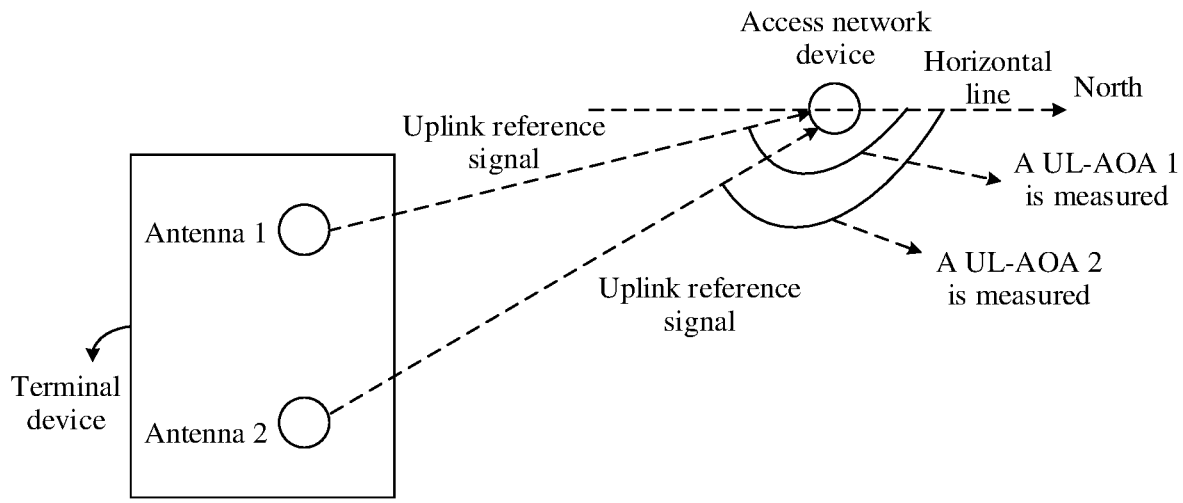
FIG. 5 is a schematic diagram of UL-AOA measurement according to an embodiment.

An uplink angle of arrival (UL-AOA) is a measurement result obtained by the access network device by measuring an uplink reference signal sent by the terminal device. The access network device may report the UL-AOA to the positioning management device, and the positioning management device determines the positioning information of the terminal device based on the UL-AOA. Optionally, in the uplink positioning information determining method, the terminal device may send uplink reference signals by using antennas corresponding to a plurality of antenna identifiers. The UL-AOA is an angle included between a direction (for example, a direction of a horizontal plane or a normal direction of the horizontal plane) and a reference signal sent by an antenna of the terminal device when the reference signal arrives at the access network device. For example, as shown in FIG. 5, the terminal device has an antenna 1 corresponding to an antenna identifier 1 and an antenna 2 corresponding to an antenna identifier 2. The access network device measures an uplink reference signal sent by the antenna 1, to obtain a UL-AOA 1. The access network device measures an uplink reference signal sent by the antenna 2, to obtain a UL-AOA 2.

Figure 6:
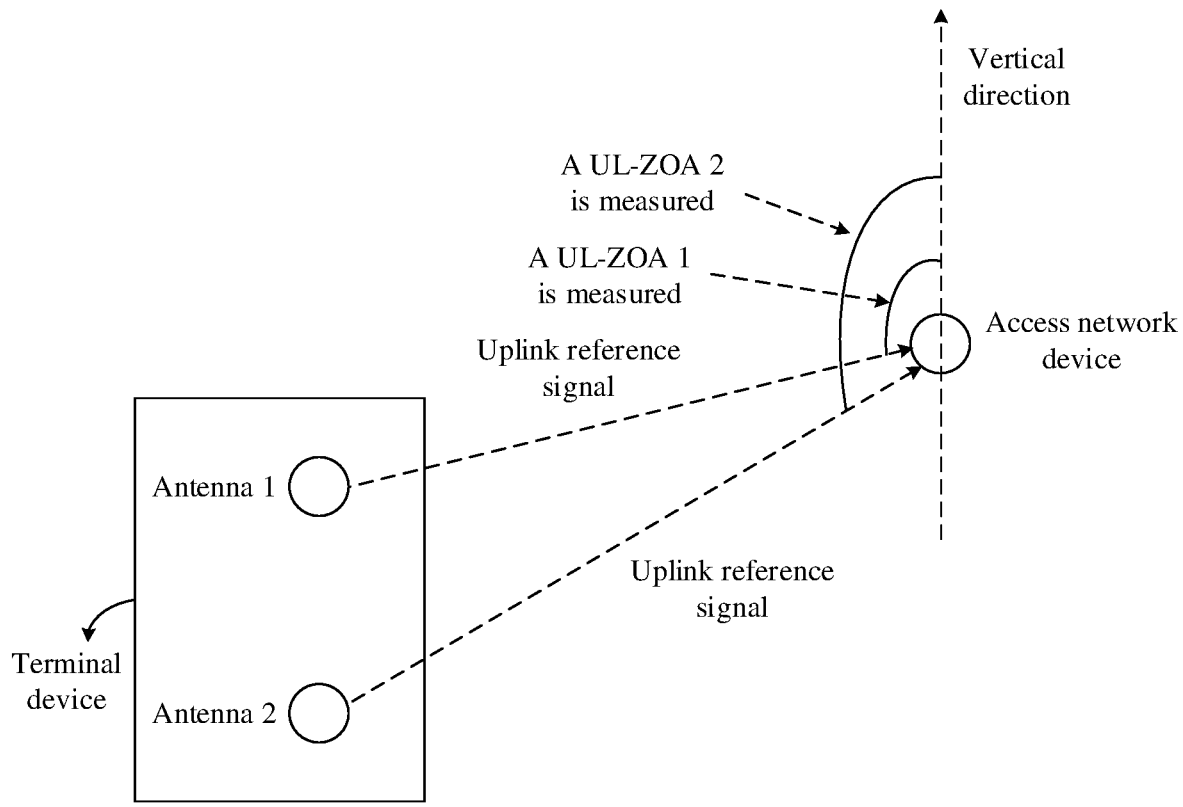
FIG. 6 is a schematic diagram of UL-ZOA measurement according to an embodiment.

An uplink zenith of arrival (UL-ZOA) is a measurement result obtained by the access network device by measuring an uplink reference signal sent by the terminal device. The access network device may report the UL-ZOA to the positioning management device, and the positioning management device determines the positioning information of the terminal device based on the UL-ZOA. Optionally, in the uplink positioning information determining method, the terminal device may send uplink reference signals by using antennas corresponding to a plurality of antenna identifiers. The UL-ZOA is an angle included between a vertical direction and a reference signal sent by an antenna of the terminal device when the reference signal arrives at the access network device. For example, as shown in FIG. 6, the terminal device has an antenna 1 corresponding to an antenna identifier 1 and an antenna 2 corresponding to an antenna identifier 2. The access network device measures an uplink reference signal sent by the antenna 1, to obtain a UL-ZOA 1. The access network device measures an uplink reference signal sent by the antenna 2, to obtain a UL-ZOA 2.

Multi-round trip time (Multi-RTT) positioning technology: The terminal device measures a downlink reference signal sent by the access network device, to obtain a UE receive-transmit time difference (UE-RxTxTimeDiff), and reports a measurement result to the positioning management device. UE-RxTxTimeDiff=$T_{uerx}$−$T_{uetx}$. $T_{uerx}$ is time at which the terminal device receives a downlink reference signal, and $T_{uetx}$ is time at which the terminal device sends an uplink reference signal. The access network device measures a gNB receive-transmit time difference (gNB-RxTxTimeDiff, gNB Rx-Tx time difference) of an uplink reference signal sent by the terminal device and reports a measurement result to the positioning management device. gNB-RxTxTimeDiff=$T_{gnbrx}$−$T_{gnbtx}$. $T_{gnbrx}$ is time at which the access network device receives an uplink reference signal, and $T_{gnbtx}$ is time at which the access network device sends a downlink reference signal. The positioning management device determines the positioning information of the terminal device based on UE-RxTxTimeDiff and gNB-RxTxTimeDiff. Optionally, in the downlink positioning information determining method, the terminal device may measure downlink reference signals by using antennas corresponding to a plurality of antenna identifiers, to obtain UE-RxTxTimeDiff corresponding to each antenna identifier. In the uplink positioning information determining method, the terminal device may send uplink reference signals by using antennas corresponding to a plurality of antenna identifiers, and the access network device obtains gNB-RxTxTimeDiff corresponding to each uplink reference signal resource. The positioning management device obtains gNB-RxTxTimeDiff corresponding to each antenna identifier based on a correspondence between an uplink signal resource and an antenna identifier.

Figure 7:
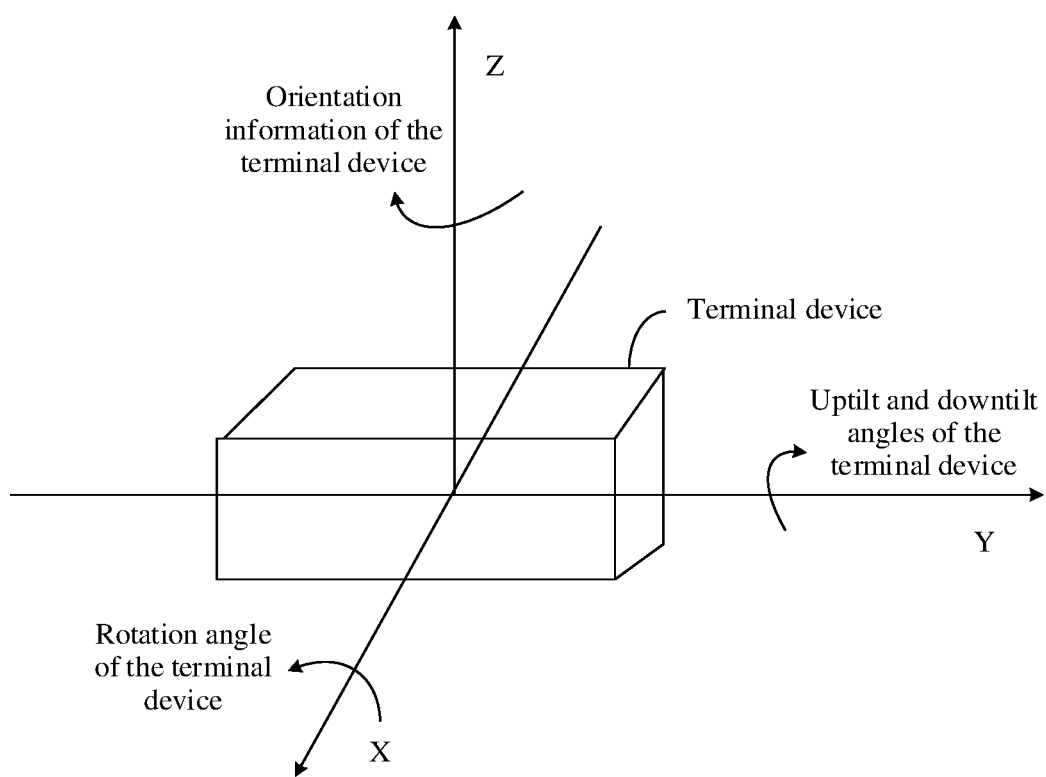
FIG. 7 is a schematic diagram of orientation information/rotation angle/uptilt and downtilt angles of a terminal device according to an embodiment.

Orientation information/rotation angle/uptilt and downtilt angles of the terminal device: For example, FIG. 7 is a coordinate system with the center of the terminal device as the origin. An angle by which the terminal device rotates around the X axis is the rotation angle of the terminal device. An angle by which the terminal device rotates around the Y axis is the uptilt and downtilt angles of the terminal device. An angle by which the terminal device rotates around the Z axis is the orientation information of the terminal device.

Figure 8:
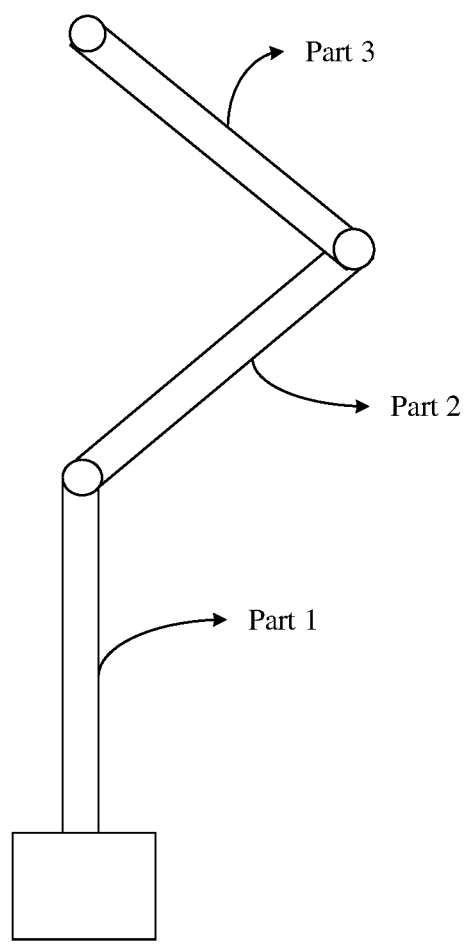
FIG. 8 is a schematic diagram of posture information of a terminal device according to an embodiment.

Posture information of the terminal device: For a terminal device (such as a mechanical arm) with an unfixed or irregular shape, a plurality of pieces of orientation information of the terminal device may form posture information of the terminal device. For example, as shown in FIG. 8, the terminal device is a mechanical arm, and the terminal device has three parts. Orientation information of a part 1 is an angle α1, orientation information of a part 2 is an angle β2, and orientation information of a part 3 is an angle β3, β1, β2, and α3 form the posture information of the mechanical arm. Alternatively, the posture information may be other information that can indicate a posture of the terminal device.

The following further describes in detail the downlink positioning information determining method provided in the embodiments.

Figure 9:
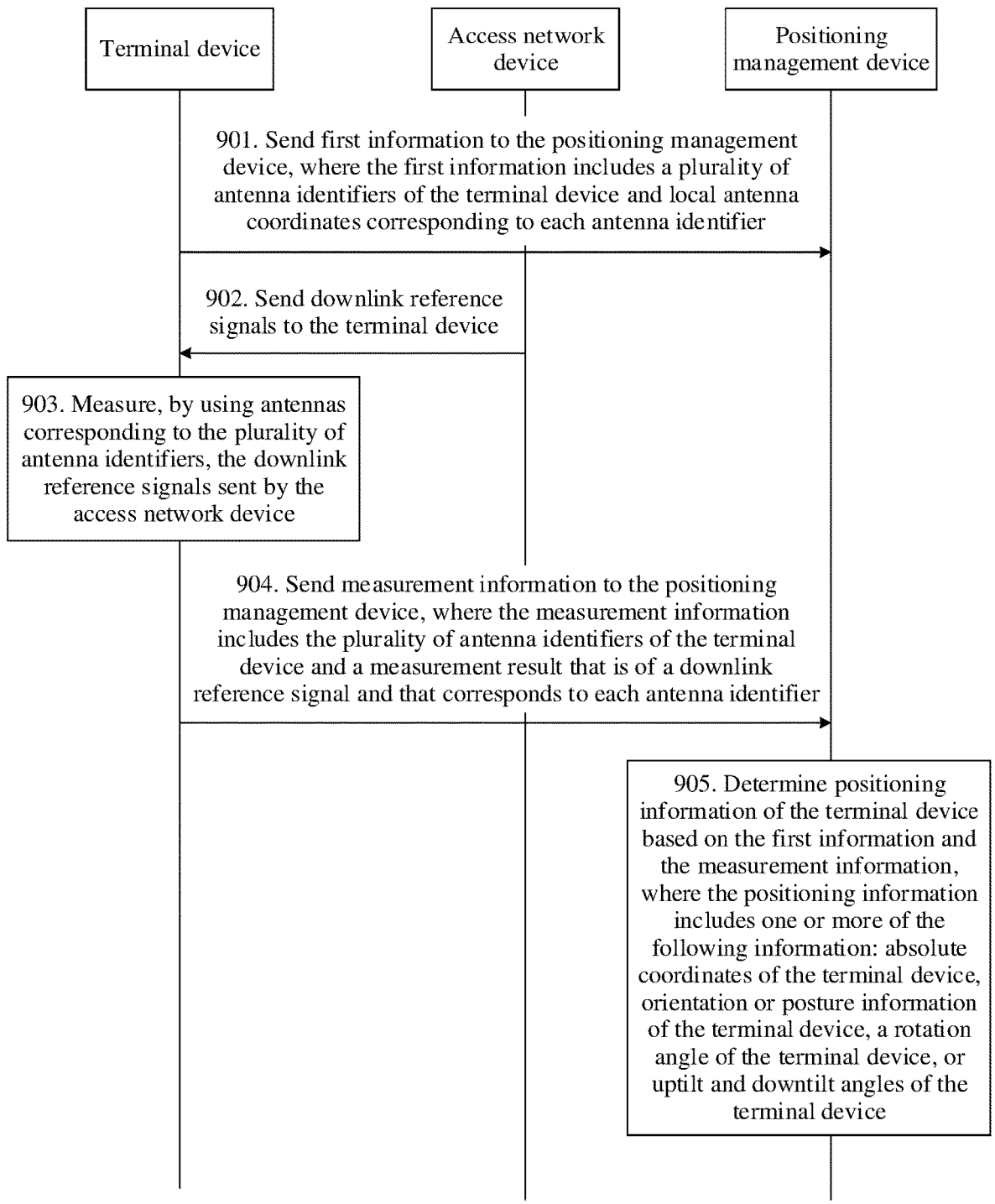
FIG. 9 is a schematic flowchart of a downlink positioning information determining method according to an embodiment.

FIG. 9 is a schematic flowchart of a downlink positioning information determining method according to an embodiment. As shown in FIG. 9, the downlink positioning information determining method includes the following step 901 to step 905. The method shown in FIG. 9 may be performed by a terminal device, an access network device, and a positioning management device, or may be performed by a chip in the terminal device, a chip in the access network device, and a chip in a chip in the access network device. FIG. 9 is described by using an example in which the method is performed by the terminal device, the access network device, and the positioning management device. Execution bodies of the positioning information determining methods shown in other accompanying drawings in the embodiments are similar to the foregoing devices. Details are not described below again.

901. A terminal device sends first information to a positioning management device, where the first information includes a plurality of antenna identifiers of the terminal device and local antenna coordinates corresponding to each of the plurality of antenna identifiers. Correspondingly, the positioning management device may receive the first information sent by the terminal device.

For descriptions of the antenna identifier, refer to the descriptions of the antenna identifier in the foregoing system architecture. Details are not described herein again. The local antenna coordinates refer to coordinates in a local coordinate system. The local coordinate system may be a two-dimensional coordinate system or a three-dimensional coordinate system with a point of the terminal device as the origin. For example, the local coordinate system may be a two-dimensional coordinate system or a three-dimensional coordinate system with the center of the terminal device as the origin.

The plurality of antenna identifiers included in the first information may be some antenna identifiers or all antenna identifiers of the terminal device. For example, the terminal device includes an antenna 1 corresponding to an antenna identifier 1 to an antenna 4 corresponding to an antenna identifier 4. The antenna identifier 1=0, and local coordinates of the antenna 1 are (−0.5, 0.5). The antenna identifier 2=1, and local coordinates of the antenna 2 are (0.5, −0.5). The antenna identifier 3=2, and local coordinates of the antenna 3 are (−0.5, −0.5). The antenna identifier 4=3, and local coordinates of the antenna 4 are (0.5, −0.5). The first information may include: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, and {antenna identifier 4=3, local coordinates of the antenna 4=(0.5, −0.5)}. Alternatively, the first information includes a plurality of antenna identifiers in the antenna identifier 1 to the antenna identifier 4 but does not include all the antenna identifiers in the antenna identifier 1 to the antenna identifier 4. For example, the first information includes: {antenna identifier 1=0, local coordinates of the antenna 1=(−0.5, 0.5)} and {antenna identifier 2=1, local coordinates of the antenna 2=(0.5, −0.5)}. It can be understood that the first information implies a correspondence between an antenna identifier and local coordinates of an antenna. After receiving the first information, the positioning management device can determine the correspondence between an antenna identifier and local coordinates of an antenna based on the first information.

In a possible implementation, the first information further includes local coordinates of a reference point of the terminal device and/or an antenna identifier that is of the terminal device and that corresponds to the reference point. A location of the reference point of the terminal device represents a location of the terminal device, in other words, absolute coordinates of the terminal device are absolute coordinates of the reference point of the terminal device. By implementing this possible implementation, after obtaining the local coordinates of the reference point of the terminal device and/or the antenna identifier that is of the terminal device and that corresponds to the reference point, the positioning management device may determine the absolute coordinates of the reference point of the terminal device based on the local coordinates of the reference point of the terminal device and/or the antenna identifier that is of the terminal device and that corresponds to the reference point, and further determine the absolute coordinates of the terminal device.

Optionally, the reference point of the terminal device may be the central location of the terminal device, or a location distant from the central location of the terminal device by less than a preset distance.

Optionally, when the reference point of the terminal device is an antenna of the terminal device, the first information further includes an antenna identifier that is of the terminal device and that corresponds to the reference point. In this scenario, the first information may include the local coordinates of the reference point of the terminal device or may not include the local coordinates of the reference point of the terminal device.

For example, if default values of the local coordinates of the reference point of the terminal device are specified in a protocol in advance, the terminal device does not need to report the local coordinates of the reference point of the terminal device in the first information, and only needs to report, in the first information, the antenna identifier that is of the terminal device and that corresponds to the reference point. For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, {antenna identifier 4=3, local coordinates of the antenna 4=(0.5, −0.5)}, and {antenna identifier of the reference point=4}. Because the protocol specifies the default values of the local coordinates of the reference point of the terminal device in advance, the positioning management device can determine the local coordinates of the reference point of the terminal device according to the specifications of the protocol. For example, if the protocol specifies in advance that the local coordinates of the reference point of the terminal device are the origin in the local coordinate system by default, the positioning management device can determine that the local coordinates of the reference point of the terminal device are (0,0). On the contrary, if the protocol does not specify default values of the local coordinates of the reference point of the terminal device in advance, the first information may further include the local coordinates of the reference point of the terminal device in addition to the antenna identifier that is of the terminal device and that corresponds to the reference point. For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, {antenna identifier 4=3, local coordinates of the antenna 4=(0.5, −0.5)}, and {antenna identifier of the reference point=4, local coordinates of the reference point=(0,0)}.

Optionally, when the reference point of the terminal device is not an antenna of the terminal device, the first information further includes the local coordinates of the reference point. Alternatively, the first information may not include the local coordinates of the reference point.

For example, if default values of the local coordinates of the reference point of the terminal device are specified in a protocol in advance, the terminal device does not need to report the local coordinates of the reference point of the terminal device in the first information. For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, and {antenna identifier 4=3, local coordinates of the antenna 4=(0.5, −0.5)}. Because the protocol specifies the default values of the local coordinates of the reference point of the terminal device in advance, the positioning management device can determine the local coordinates of the reference point of the terminal device according to the specifications of the protocol. For example, if the protocol specifies in advance that the local coordinates of the reference point of the terminal device are the origin in the local coordinate system by default, the positioning management device can determine that the local coordinates of the reference point of the terminal device are (0,0). On the contrary, if the protocol does not specify default values of the local coordinates of the reference point of the terminal device in advance, the first information may further include the local coordinates of the reference point of the terminal device. For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, {antenna identifier 4=3, local coordinates of the antenna 4=(0.5, −0.5)}, and {local coordinates of the reference point=(0,0)}.

In a possible implementation, an implementation in which the terminal device sends the first information to the positioning management device is: The terminal device sends a positioning capability message of the terminal device to the positioning management device, where the positioning capability message of the terminal device carries the first information, and the positioning capability message indicates that the terminal device has a capability of determining positioning information by using a plurality of antennas. Correspondingly, an implementation in which the positioning management device receives the first information sent by the terminal device is: The positioning management device receives the positioning capability message sent by the terminal device. The terminal device may include the first information and positioning capability information of the terminal device to a same message and sends the message to the positioning management device.

The terminal device may send the positioning capability message of the terminal device to the positioning management device before performing step 902. The capability of determining positioning information by using a plurality of antennas means whether the terminal device has a capability of measuring, by using antennas corresponding to the plurality of antenna identifiers, downlink reference signals sent by the access network device. By implementing this possible implementation, the positioning management device can obtain the positioning capability message of the terminal device in time. In this way, the positioning management device can subsequently determine whether positioning can be performed by using a multi-antenna positioning algorithm. In addition, the first information is included in the positioning capability message and sent to the positioning management device, so that the positioning management device can know earlier information such as the antenna identifier of the terminal device and the local antenna coordinates corresponding to the antenna identifier.

Figure 10:
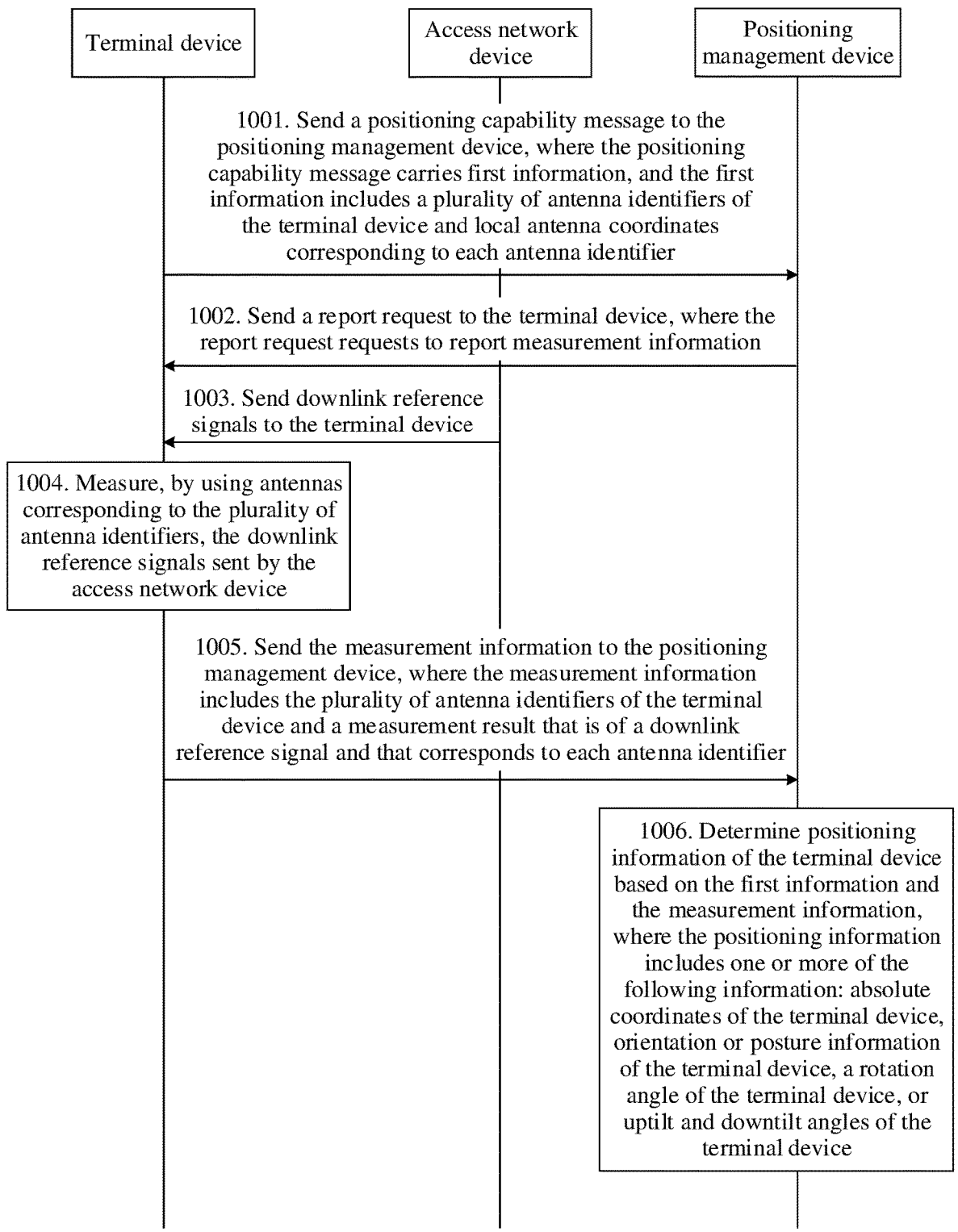
FIG. 10 is a schematic flowchart of another downlink positioning information determining method according to an embodiment.

In a possible implementation, as shown in FIG. 10, after the positioning management device receives the positioning capability message of the terminal device sent by the terminal device, and before the positioning management device receives the measurement information sent by the terminal device, step 1002 may be further performed: The positioning management device sends a report request to the terminal device, where the report request requests to report the measurement information including the plurality of antenna identifiers of the terminal device and a measurement result that is of a downlink reference signal and that corresponds to each antenna identifier. Correspondingly, after sending the positioning capability message of the terminal device to the positioning management device, and before measuring, by using the antennas corresponding to the plurality of antenna identifiers, the downlink reference signals sent by the access network device, the terminal device may further receive the report request sent by the positioning management device. Implementations of step 1001 and step 1003 to step 1006 are not described herein.

In other words, in this possible implementation, the positioning management device may send the reporting request to the terminal device, to request the terminal device to measure, by using the antennas corresponding to the plurality of antenna identifiers, the downlink reference signals sent by the access network device, and report the measurement information including the plurality of antenna identifiers of the terminal device and the measurement result that is of the downlink reference signal and that corresponds to each antenna identifier. By implementing this possible implementation, the positioning management device may flexibly obtain required measurement information from the terminal device based on a positioning requirement.

Optionally, the positioning management device may send the report request to the terminal device based on a service positioning precision requirement of the terminal device. For example, if the service positioning precision requirement of the terminal device is higher than or equal to a preset value, the positioning management device sends a report request to the terminal device. The report request requests the terminal device to report the measurement information including the plurality of antenna identifiers of the terminal device and the measurement result that is of the downlink reference signal and that corresponds to each antenna identifier. If the service positioning precision requirement of the terminal device is lower than a preset value, the positioning management device sends a report request to the terminal device. The report request requests the terminal device to report measurement information of a single antenna (that is, in an existing solution, all antennas of the terminal device are considered as a single antenna, and signals of the antenna are measured to obtain a measurement result). Based on this optional manner, the positioning management device may flexibly obtain the required measurement information based on the service positioning precision requirement of the terminal device.

Figure 11:
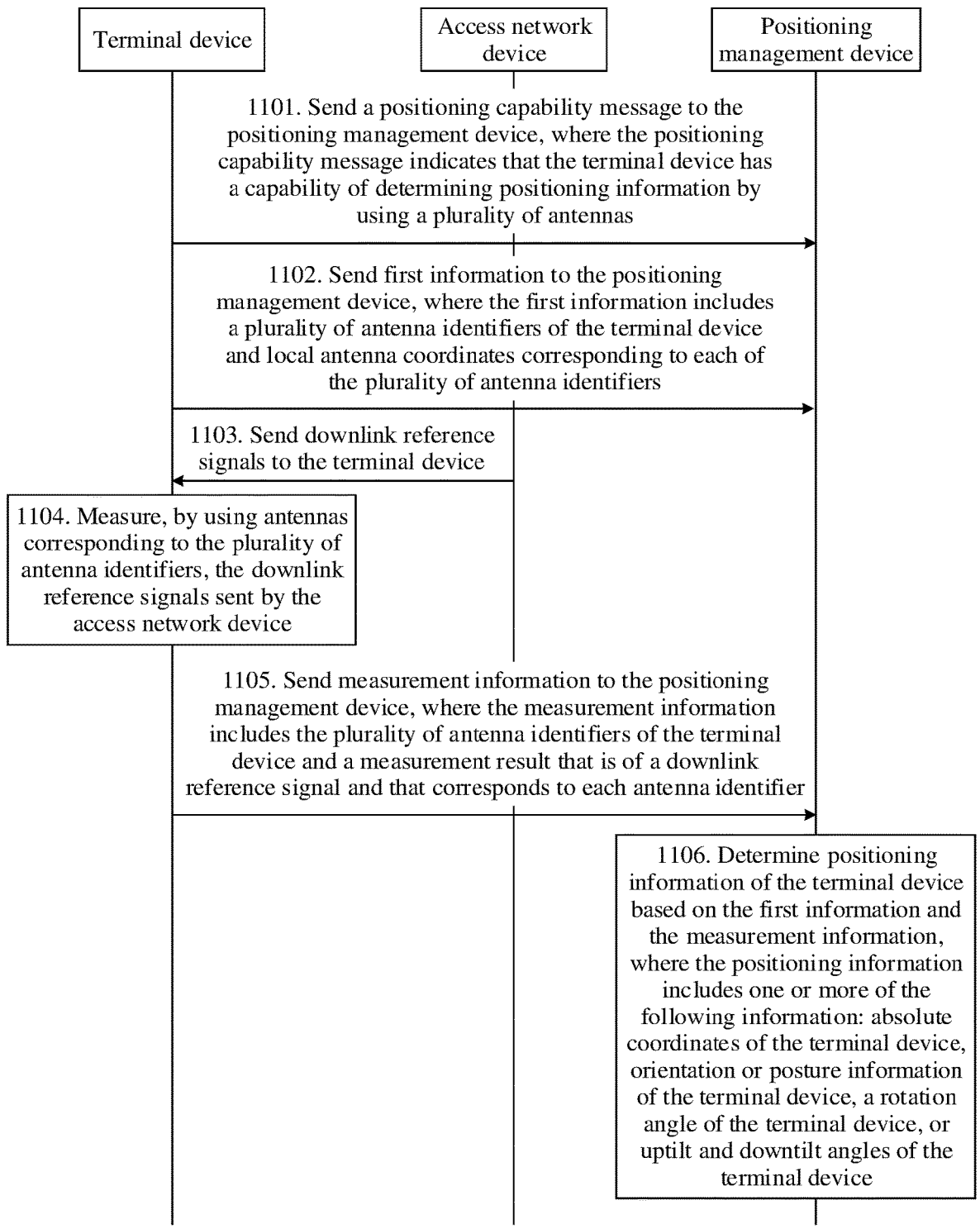
FIG. 11 is a schematic flowchart of another downlink positioning information determining method according to an embodiment.

In a possible implementation, as shown in FIG. 11, before measuring, by using the antennas corresponding to the plurality of antenna identifiers, the downlink reference signals sent by the access network device, the terminal device may further perform step 1101, that is, the terminal device sends a positioning capability message of the terminal device to the positioning management device, where the positioning capability message indicates that the terminal device has a capability of determining positioning information by using a plurality of antennas. Correspondingly, before receiving the measurement information sent by the terminal device, the positioning management device may further receive the positioning capability message sent by the terminal device. An implementation of step 1102 to step 1106 is not described herein.

In other words, in this possible implementation, the first information is sent to the positioning management device without being carried in the positioning capability message. Optionally, the first information may be sent to the positioning management device before the positioning capability message is sent, or the first information may be sent to the positioning management device after the positioning capability message is sent. By implementing this possible implementation, the positioning management device can obtain the positioning capability message of the terminal device in time. In this way, the positioning management device can subsequently determine whether positioning can be performed by using a multi-antenna positioning algorithm.

Figure 12:
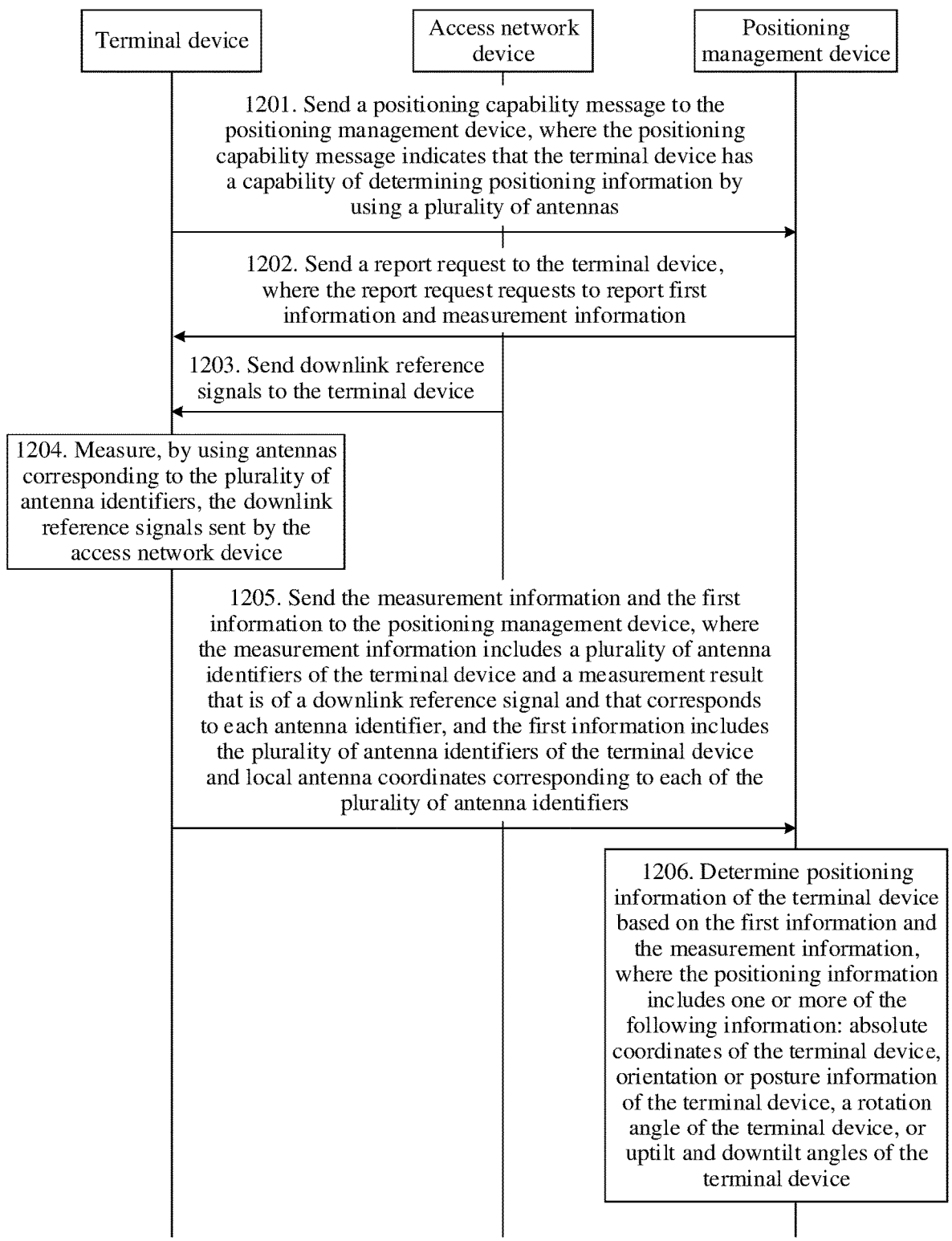
FIG. 12 is a schematic flowchart of another downlink positioning information determining method according to an embodiment.

In a possible implementation, as shown in FIG. 12, after receiving the positioning capability message of the terminal device sent by the terminal device, the positioning management device may further perform step 1202: The positioning management device sends a report request to the terminal device, where the report request requests to report the first information and the measurement information including the plurality of antenna identifiers of the terminal device and a measurement result that is of a downlink reference signal and that corresponds to each antenna identifier. Correspondingly, after sending the positioning capability message of the terminal device to the positioning management device, and before measuring, by using the antennas corresponding to the plurality of antenna identifiers, the downlink reference signals sent by the access network device, the terminal device may further receive the report request sent by the positioning management device. In this way, after measuring, by using the antennas corresponding to the plurality of antenna identifiers, the downlink reference signals sent by the access network device, the terminal device may include the measurement information and the first information to a same message and send the message to the positioning management device. Implementations of step 1201 and step 1203 to step 1206 are not described herein.

Based on this possible implementation, the positioning management device may flexibly obtain required measurement information from the terminal device based on a positioning requirement. In addition, the terminal device needs to report the first information only when the positioning management device needs to use the multi-antenna positioning algorithm. This helps save communication resources.

Optionally, the positioning management device may send the report request to the terminal device based on a service positioning precision requirement of the terminal device. For example, if the service positioning precision requirement of the terminal device is higher than or equal to a preset value, the positioning management device sends a report request to the terminal device. The report request requests the terminal device to report the first information and the measurement information including the plurality of antenna identifiers of the terminal device and the measurement result that is of the downlink reference signal and that corresponds to each antenna identifier. If the service positioning precision requirement of the terminal device is lower than a preset value, the positioning management device sends a report request to the terminal device. The report request requests the terminal device to report a measurement result of a single antenna (that is, in an existing solution, all antennas of the terminal device are considered as a single antenna, and signals of the antenna are measured to obtain a measurement result). Based on this optional manner, the positioning management device may flexibly obtain the required measurement information based on the service positioning precision requirement of the terminal device.

In conclusion, the terminal device may include the first information in the positioning capability message and send the positioning capability message to the positioning management device. Alternatively, the first information may be sent to the positioning management device before the positioning capability message is sent, or the first information may be sent to the positioning management device after the positioning capability message is sent. Alternatively, the first information and the measurement information may be carried in a same message and sent to the positioning management device.

902. The access network device sends downlink reference signals to the terminal device.

In this embodiment, one or more access network devices may send the downlink reference signals to the terminal device. The downlink reference signal may be a channel state information-reference signal (CSI-RS), a positioning reference signal (PRS), or the like.

903. The terminal device measures, by using the antennas corresponding to the plurality of antenna identifiers, the downlink reference signals sent by the access network device.

In this embodiment, the terminal device may measure, by using the antennas corresponding to the plurality of antenna identifiers, the downlink reference signals sent by the one or more access network devices. The plurality of antenna identifiers herein may be some antenna identifiers in the first information or may be all antenna identifiers in the first information. For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, and {antenna identifier 4=3, local coordinates of the antenna 4=(0.5, −0.5)}. The terminal device may measure, by using the antenna 1 to the antenna 4, the downlink reference signals sent by the access network device. Alternatively, the terminal device may measure, by using two or three antennas in the antenna 1 to the antenna 4, the downlink reference signals sent by the access network device.

In a possible implementation, a measurement result obtained by the terminal device by measuring the downlink reference signals by using the antennas corresponding to the plurality of antenna identifiers may be one or more of the following information: an RSTD, an RSRP, an SS-RSRP, an SS-RSRQ, an SS-SINR, or a UE receive-transmit time difference. For the descriptions of the RSTD, the RSRP, the SS-RSRP, the SS-RSRQ, the SS-SINR, or the UE receive-transmit time difference, refer to the descriptions corresponding to the foregoing descriptions of related terms. Details are not described herein again.

In a possible implementation, for a plurality of access network devices, an antenna corresponding to each antenna identifier may measure the downlink reference signals sent by all access network devices, or antennas corresponding to one or more antenna identifiers measure only downlink reference signals sent by some access network devices. It needs to be ensured that an antenna corresponding to each of the plurality of antenna identifiers in step 903 measures a downlink reference signal. Which antenna corresponding to an antenna identifier is used to measure a downlink reference signal sent by an access network device is not limited in this embodiment. For example, the access network device includes an access network device 1 to an access network device 3. Both an antenna 1 and an antenna 2 may measure downlink reference signals sent by the access network device 1 to the access network device 3. Alternatively, the antenna 1 measures downlink reference signals sent by the access network device 1 and the access network device 2, and the antenna 2 measures downlink reference signals sent by the access network device 1 and the access network device 3.

904. The terminal device sends measurement information to the positioning management device, where the measurement information includes the plurality of antenna identifiers of the terminal device and a measurement result that is of a downlink reference signal and that corresponds to each antenna identifier.

In this embodiment, after obtaining the measurement results corresponding to the plurality of antenna identifiers, the terminal device sends the measurement information to the positioning management device. The measurement information includes the plurality of antenna identifiers of the terminal device and the measurement result that is of the downlink reference signal and that corresponds to each antenna identifier. For example, the measurement information reported by the terminal device may be: {measurement result 1, antenna identifier 1}, {measurement result 2, antenna identifier 2}, {measurement result 3, antenna identifier 3}, and {measurement result 4, antenna identifier 4}. In this way, after receiving the measurement information, the positioning management device can determine a correspondence between a measurement result and an antenna identifier based on the measurement information.

In a possible implementation, the plurality of antenna identifiers included in the measurement information may be all or some antenna identifiers that measure the downlink reference signals in step 903. After obtaining the measurement results corresponding to the plurality of antenna identifiers, the terminal device may choose to report only measurement results corresponding to some antenna identifiers. For example, after obtaining the measurement result 1 corresponding to the antenna identifier 1 to the measurement result 4 corresponding to the antenna identifier 4, the terminal device may report only {measurement result 1, antenna identifier 1} and {measurement result 2, antenna identifier 2}.

The following further describes an information element structure of the measurement information by using an example in which the measurement result is an RSTD.

It is assumed that the access network device includes an access network device 1, an access network device 2, and an access network device 3. The access network device 1 is a reference device. The terminal device measures, by using an antenna 1 corresponding to an antenna identifier 1, downlink reference signals sent by the access network device 1 and the access network device 2, to obtain an RSTD 1. The terminal device measures, by using an antenna 2 corresponding to an antenna identifier 2, downlink reference signals sent by the access network device 1 and the access network device 2, to obtain an RSTD 2. The terminal device measures, by using an antenna 3 corresponding to an antenna identifier 3, downlink reference signals sent by the access network device 1 and the access network device 3, to obtain an RSTD 3. The terminal device measures, by using an antenna 4 corresponding to an antenna identifier 4, downlink reference signals sent by the access network device 1 and the access network device 3, to obtain an RSTD 4. In the measurement information reported by the terminal device, an information element structure of a measurement result corresponding to the access network device 2 and an information element structure of an antenna identifier corresponding to the measurement result may have the following information element structures:

rx-ID-additional is an antenna identifier 2. In the measurement information reported by the terminal device, an information element structure of a measurement result corresponding to the access network device 3 and an information element structure of an antenna identifier corresponding to the measurement result are similar to the foregoing descriptions. Details are not described herein again. When the measurement result is the RSRP, the SS-RSRP, the SS-RSRQ, the SS-SINR, or the UE receive-transmit time difference, an information element structure of the measurement information is similar to the foregoing descriptions. Details are not described herein again.

905. The positioning management device determines positioning information of the terminal device based on the first information and the measurement information, where the positioning information includes one or more of the following information: absolute coordinates of the terminal device, orientation or posture information of the terminal device, a rotation angle of the terminal device, or uptilt and downtilt angles of the terminal device.

In this embodiment, after receiving the first information and the measurement information, the positioning management device determines the positioning information of the terminal device based on the first information and the measurement information. The positioning information includes one or more of the following information: the absolute coordinates of the terminal device, the orientation

```
NR-DL-TDOA-MeasElement-r16 ::= SEQUENCE {
    trp-ID-r16                TRP-ID-r16         OPTIONAL,
    nr-DL-PRS-ResourceId-r16  NR-DL-PRS-ResourceId-r16    OPTIONAL,
    nr-DL-PRS-ResourceSetId-r16   NR-DL-PRS-ResourceSetId-r16 OPTIONAL,
    nr-TimeStamp-r16          NR-TimeStamp-r16,
    nr-RSTD-r16               INTEGER (0..ffs),      -- FFS on the value range
    nr-AdditionalPathList-r16 NR-AdditionalPathList-r16    OPTIONAL,
    nr-TimingMeasQuality-r16      NR-TimingMeasQuality-r16,
    nr-PRS-RSRP-Result-r16    INTEGER (FFS)      OPTIONAL, -- FFS, value range to be decided in RAN4.
    nr-DL-TDOA-AdditionalMeasurements-r16
    NR-DL-TDOA-AdditionalMeasurements-r16,
    ...,
    [[
    rx-ID                 INTEGER (0..3)        OPTIONAL
    ]]
    }
    NR-DL-TDOA-AdditionalMeasurements-r16 ::= SEQUENCE (SIZE (1..3)) OF NR-DL-TDOA-AdditionalMeasurementElement-r16
    NR-AdditionalPathList-r16 ::= SEQUENCE (SIZE(1..2)) OF NR-AdditionalPath-r16
    NR-DL-TDOA-AdditionalMeasurementElement-r16 ::= SEQUENCE {
        nr-DL-PRS-ResourceId-r16      NR-DL-PRS-ResourceId-r16    OPTIONAL,
        nr-DL-PRS-ResourceSetId-r16   NR-DL-PRS-ResourceSetId-r16 OPTIONAL,
        nr-TimeStamp-r16          NR-TimeStamp-r16,
        nr-RSTD-ResultDiff-r16    INTEGER (0..ffs),    -- FFS on the value range to be decided in RAN4
        dl-PRS-RSRP-ResultDiff-r16   INTEGER (FFS)    OPTIONAL, -- FFS on the value range to be decided in RAN4
        nr-AdditionalPathList-r16     NR-AdditionalPathList-r16   OPTIONAL,
        ...,
        [[
        rx-ID-additional          INTEGER (0..3)        OPTIONAL
        ]]
        }
```

In the foregoing information element structures, nr-RSTD-r16 and nr-RSTD-ResultDiff-r16 are values of the RSTD. rx-ID is an antenna identifier corresponding to nr-RSTD-r16. rx-ID-additional is an antenna identifier corresponding to nr-RSTD-ResultDiff-r16. For example, nr-RSTD-r16 may be an RSTD 1, and rx-ID is an antenna identifier 1. additionalDelay-r16 may be an RSTD 2, and or posture information of the terminal device, the rotation angle of the terminal device, or the uptilt and downtilt angles of the terminal device. The absolute coordinates of the terminal device are coordinates of the terminal device in an absolute coordinate system. The absolute coordinates of the terminal device may be two-dimensional coordinates or three-dimensional coordinates. For definitions of the orientation or posture information of the terminal device, the rotation angle of the terminal device, and the uptilt and downtilt angles of the terminal device, refer to descriptions in the foregoing descriptions of related terms. Details are not described herein again.

The following describes two implementations in which the positioning management device determines the absolute coordinates of the terminal device based on the first information and the measurement information.

Manner 1: The absolute coordinates of the terminal device are the absolute coordinates of the reference point of the terminal device, the reference point is not an antenna of the terminal device, and the positioning management device determines absolute coordinates corresponding to the antenna identifier based on the measurement information, the antenna identifier in the first information, and the local antenna coordinates of the antenna identifier; and the positioning management device determines the absolute coordinates of the reference point based on the absolute coordinates corresponding to the antenna identifier, the local antenna coordinates corresponding to the antenna identifier, and the local coordinates of the reference point.

For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, {antenna identifier 4=3, local coordinates of the antenna 4=(0.5, −0.5)}, and {local coordinates of the reference point=(0,0)}. The measurement information includes: {measurement result 1, antenna identifier 1}, {measurement result 2, antenna identifier 2}, {measurement result 3, antenna identifier 3}, and {measurement result 4, antenna identifier 4}. After receiving the first information and the measurement information, the positioning management device first determines initial absolute coordinates of the antenna 1 based on the measurement result 1, determines initial absolute coordinates of the antenna 2 based on the measurement result 2, determines initial absolute coordinates of the antenna 3 based on the measurement result 3, and determines initial absolute coordinates of the antenna 4 based on the measurement result 4. Then, the positioning management device determines a relative location relationship between the antenna 1 to the antenna 4 based on the local coordinates of the antenna 1 to the antenna 4 in the first information. The positioning management device calibrates the initial absolute coordinates of the antenna 1 to the initial absolute coordinates of the antenna 4 based on the relative location relationship between the antenna 1 to the antenna 4 and determines the calibrated absolute coordinates as final absolute coordinates of the antenna 1 to the antenna 4. After determining the absolute coordinates of the antenna 1 to the antenna 4, the positioning management device can determine the absolute coordinates of the reference point with reference to local antenna coordinates of the antenna 1 to the antenna 4 and the local coordinates of the reference point.

Manner 2: The absolute coordinates of the terminal device are the absolute coordinates of the reference point of the terminal device, the reference point is an antenna of the terminal device, the measurement information includes a measurement result corresponding to the reference point, and the positioning management device determines absolute coordinates corresponding to the antenna identifier and the absolute coordinates of the reference point based on the measurement information, the local coordinates of the reference point, the antenna identifier in the first information, and the local antenna coordinates of the antenna identifier.

For example, the first information includes: {antenna identifier 1=0, local coordinates of the antenna 1=(−0.5, 0.5)}, {antenna identifier 2=1, local coordinates of the antenna 2=(0.5, −0.5)}, {antenna identifier 3=2, local coordinates of the antenna 3=(−0.5, −0.5)}, {antenna identifier 4=3, local coordinates of the antenna 4=(0.5, −0.5)}, and {antenna identifier of the reference point=4, local coordinate of the reference point=(0,0)}. The measurement information includes: {measurement result 1, antenna identifier 1}, {measurement result 2, antenna identifier 2}, {measurement result 3, antenna identifier 3}, {measurement result 4, antenna identifier 4}, and {measurement result 5, antenna identifier of the reference point}. After receiving the first information and the measurement information, the positioning management device first determines initial absolute coordinates of the antenna 1 based on the measurement result 1, determines initial absolute coordinates of the antenna 2 based on the measurement result 2, determines initial absolute coordinates of the antenna 3 based on the measurement result 3, determines initial absolute coordinates of the antenna 4 based on the measurement result 4, and determines initial absolute coordinates of the reference point based on the measurement result 5. Then, the positioning management device determines a relative location relationship between the antenna 1 to the antenna 4 and the reference point based on the local coordinates of the antenna 1 to the antenna 4 and the reference point in the first information. The positioning management device calibrates the initial absolute coordinates of the antenna 1 to the initial absolute coordinates of the antenna 4 and the initial absolute coordinates of the reference point based on the relative position relationship between the antenna 1 to the antenna 4 and the reference point, and determines the calibrated absolute coordinates as final absolute coordinates of the antenna 1 to the antenna 4 and the absolute coordinates of the reference point.

Based on manner 1 and manner 2 above, the absolute coordinates of the terminal device can be accurately determined.

In a possible implementation, an implementation in which the positioning management device determines the orientation or posture information of the terminal device, the rotation angle, and/or the uptilt and downtilt angles of the terminal device based on antenna information and the measurement information is: The positioning management device determines an absolute location corresponding to each antenna identifier based on the measurement information, the plurality of antenna identifiers, and the local antenna coordinates corresponding to each antenna identifier. The positioning management device determines the orientation or posture information of the terminal device, the rotation angle, and/or the uptilt and downtilt angles of the terminal device based on a conversion relationship between the absolute location corresponding to each antenna identifier and the local antenna coordinates corresponding to each antenna identifier. For an implementation in which the positioning management device determines the absolute location corresponding to each antenna identifier based on the measurement information, the plurality of antenna identifiers, and the local antenna coordinates corresponding to each antenna identifier, refer to the foregoing descriptions. Details are not described herein again. Based on this possible implementation, the orientation or posture information of the terminal device, the rotation angle, and/or the uptilt and downtilt angles of the terminal device can be accurately determined.

It can be understood that by implementing the downlink positioning information determining method described in FIG. 9, the positioning management device may determine the positioning information of the terminal device with reference to the first information and the measurement results corresponding to the plurality of antenna identifiers. This helps improve the precision of determining the positioning information of the terminal device. In addition, in the method described in FIG. 9, the positioning information of the terminal device may alternatively be determined by sending a downlink reference signal by one access network device. This helps reduce an environment deployment condition for determining a location, an orientation, or a posture of the terminal device.

The following further describes in detail the uplink positioning information determining method provided in the embodiments.

Figure 13:
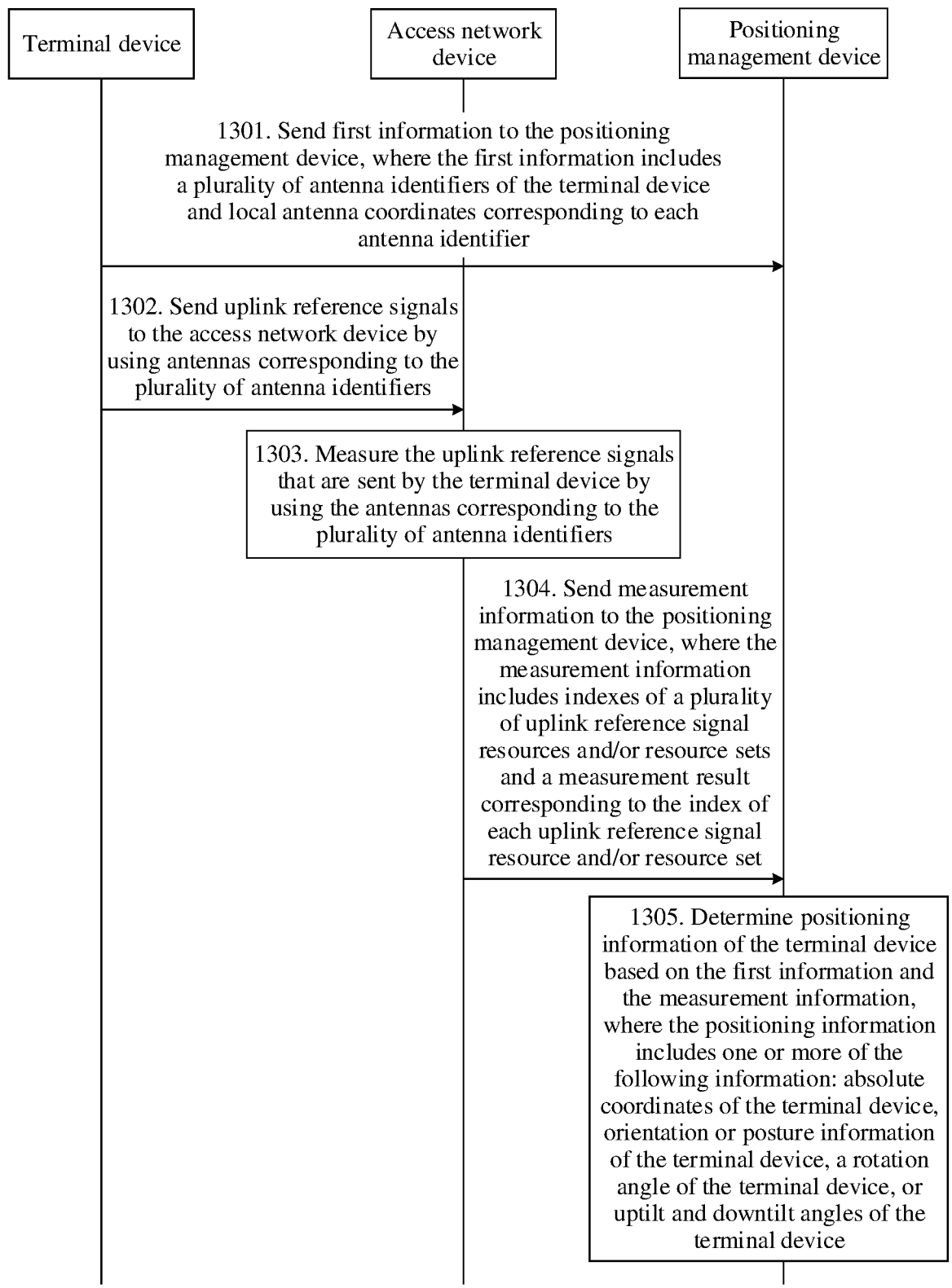
FIG. 13 is a schematic flowchart of an uplink positioning information determining method according to an embodiment.

FIG. 13 is a schematic flowchart of an uplink positioning information determining method according to an embodiment. As shown in FIG. 13, the uplink positioning information determining method includes the following step 1301 to step 1305.

1301. A terminal device sends first information to a positioning management device, where the first information includes a plurality of antenna identifiers of the terminal device and local antenna coordinates corresponding to each of the plurality of antenna identifiers. Correspondingly, the positioning management device may receive the first information sent by the terminal device.

For related descriptions of the antenna identifiers and the local antenna coordinates in step 1301, refer to the foregoing descriptions of step 901. Details are not described herein again. Step 1301 may be performed before step 1302.

In a possible implementation, the first information further includes local coordinates of a reference point of the terminal device and/or an antenna identifier that is of the terminal device and that corresponds to the reference point. A location of the reference point of the terminal device represents a location of the terminal device, in other words, absolute coordinates of the terminal device are absolute coordinates of the reference point of the terminal device. By implementing this possible implementation, after obtaining the local coordinates of the reference point of the terminal device and/or the antenna identifier that is of the terminal device and that corresponds to the reference point, the positioning management device may determine the absolute coordinates of the reference point of the terminal device based on the local coordinates of the reference point of the terminal device and/or the antenna identifier that is of the terminal device and that corresponds to the reference point, and further determine the absolute coordinates of the terminal device. For other related descriptions of the reference point, refer to the embodiment corresponding to FIG. 9. Details are not described herein again.

In a possible implementation, an implementation in which the terminal device sends the first information to the positioning management device is: The terminal device sends a positioning capability message of the terminal device to the positioning management device, where the positioning capability message of the terminal device carries the first information, and the positioning capability message indicates that the terminal device has a capability of determining positioning information by using a plurality of antennas. Correspondingly, an implementation in which the positioning management device receives the first information sent by the terminal device is: The positioning management device receives the positioning capability message sent by the terminal device. The terminal device may include the first information and positioning capability information of the terminal device to a same message and may send the message to the positioning management device.

The capability of determining positioning information by using a plurality of antennas means whether the terminal device has a capability of measuring, by using the antennas corresponding to the plurality of antenna identifiers, downlink reference signals sent by an access network device. By implementing this possible implementation, the positioning management device can obtain the positioning capability message of the terminal device in time. In this way, the positioning management device can subsequently determine whether positioning can be performed by using a multi-antenna positioning algorithm. In addition, the first information is included in the positioning capability message and sent to the positioning management device, so that the positioning management device can know earlier information such as the antenna identifier of the terminal device and the local antenna coordinates corresponding to the antenna identifier.

1302. The terminal device sends uplink reference signals to the access network device by using antennas corresponding to the plurality of antenna identifiers.

In this embodiment, after sending the first information, the terminal device may send the uplink reference signals to one or more access network devices by using the antennas corresponding to the plurality of antenna identifiers. The plurality of antenna identifiers herein may be some antenna identifiers in the first information or may be all antenna identifiers in the first information. The uplink reference signal may be a sounding reference signal (SRS) or another uplink reference signal.

1303. The access network device measures the uplink reference signals that are sent by the terminal device by using the antennas corresponding to the plurality of antenna identifiers.

In this embodiment, the one or more access network devices may measure the uplink reference signals that are sent by the terminal device by using the antennas corresponding to the plurality of antenna identifiers. A measurement result may be one or more of the following information: UL-RTOA, UL-AOA, UL-ZOA, or a gNB receive-send time difference. For the descriptions of the UL-RTOA, the UL-AOA, the UL-ZOA, or the gNB receive-transmit time difference, refer to the descriptions corresponding to the foregoing descriptions of related terms. Details are not described herein again.

In a possible implementation, for a plurality of access network devices, each access network device may measure uplink reference signals sent by antennas corresponding to all of the plurality of antenna identifiers, or one or more antenna access network devices measure only uplink reference signals sent by antennas corresponding to some of the plurality of antenna identifiers. However, it needs to be ensured that an uplink reference signal sent by an antenna corresponding to each of the plurality of antenna identifiers needs to be measured. Which access network device measures an uplink reference signal sent by an antenna corresponding to an antenna identifier is not limited in this embodiment. For example, the access network device includes an access network device 1 and an access network device 2. The access network device 1 may measure downlink reference signals sent by an antenna 1 and an antenna 2, and the access network device 2 may measure downlink reference signals sent by the antenna 1 and the antenna 2. Alternatively, the access network device 1 may measure a downlink reference signal sent by an antenna 1, and the access network device 2 may measure a downlink reference signal sent by an antenna 2.

1304. The access network device sends measurement information to the positioning management device, where the measurement information includes indexes of a plurality of uplink reference signal resources and/or resource sets and a measurement result corresponding to the index of each uplink reference signal resource and/or resource set.

In this embodiment, after measuring the uplink reference signals that are sent by the terminal device by using the antennas corresponding to the plurality of antenna identifiers, the one or more access network devices send the measurement information to the positioning management device. The measurement information includes the indexes of the plurality of uplink reference signal resources and/or resource sets and the measurement result corresponding to the index of each uplink reference signal resource and/or resource set. The measurement result corresponding to the index of the uplink reference signal resource and/or resource set is a measurement result obtained by the access network device by performing measurement on the uplink reference signal resource and/or resource set. For example, the access network device measures the uplink reference signal on the uplink reference signal resource 1 and/or resource set 1, to obtain a measurement result 1. In this case, the measurement result 1 is a measurement result corresponding to an index of the uplink reference signal resource 1 and/or resource set 1. For example, the measurement information reported by the one or more access network devices may be {measurement result 1, index of the uplink reference signal resource 1, index of the resource set 1}, {measurement result 2, index of an uplink reference signal resource 2, index of a resource set 2}, {measurement result 3, index of an uplink reference signal resource 3, index of a resource set 3}, and {measurement result 4, index of an uplink reference signal resource 4, index of a resource set 4}. In this way, after receiving the measurement information, the positioning management device can determine, based on the measurement information, a correspondence between a measurement result and an index of an uplink reference signal resource and/or resource set.

In a possible implementation, after obtaining measurement results corresponding to the indexes of the plurality of uplink reference signal resources and/or resource sets, the one or more access network devices may choose to report measurement results corresponding to indexes of all or some of the plurality of uplink reference signal resources and/or resource sets. For example, after the one or more access network devices obtain a measurement result 1 to a measurement result 4, the measurement information may include only {measurement result 1, index of the uplink reference signal resource 1 and/or resource set 1} and {measurement result 2, index of the uplink reference signal resource 2 and/or resource set 2}.

1305. The positioning management device determines positioning information of the terminal device based on the first information and the measurement information, where the positioning information includes one or more of the following information: absolute coordinates of the terminal device, orientation or posture information of the terminal device, a rotation angle of the terminal device, and uptilt and downtilt angles of the terminal device.

In this embodiment, after receiving the measurement information sent by the access network device, the positioning management device determines the positioning information of the terminal device based on the first information and the measurement information, where the positioning information includes one or more of the following information: the absolute coordinates of the terminal device, the orientation or posture information of the terminal device, the rotation angle of the terminal device, and the uptilt and downtilt angles of the terminal device. The absolute coordinates of the terminal device are coordinates of the terminal device in an absolute coordinate system. The absolute coordinates of the terminal device may be two-dimensional coordinates or three-dimensional coordinates. For definitions of the orientation or posture information of the terminal device, the rotation angle of the terminal device, and the uptilt and downtilt angles of the terminal device, refer to descriptions in the foregoing descriptions of related terms. Details are not described herein again. For how the positioning management device determines the positioning information of the terminal device based on the first information and the measurement information, refer to descriptions in the embodiment corresponding to FIG. 14A and FIG. 14B. Details are not described herein.

It can be understood that by implementing the downlink positioning information determining method described in FIG. 13, the positioning management device may determine the positioning information of the terminal device with reference to the first information and the measurement results of the uplink reference signals sent by the plurality of antenna identifiers. This helps improve the precision of determining the positioning information of the terminal device. In addition, in the method described in FIG. 13, the positioning information of the terminal device may alternatively be determined by receiving an uplink reference signal by one access network device. This helps reduce an environment deployment condition for determining a location, an orientation, or a posture of the terminal device.

Figure 14A:
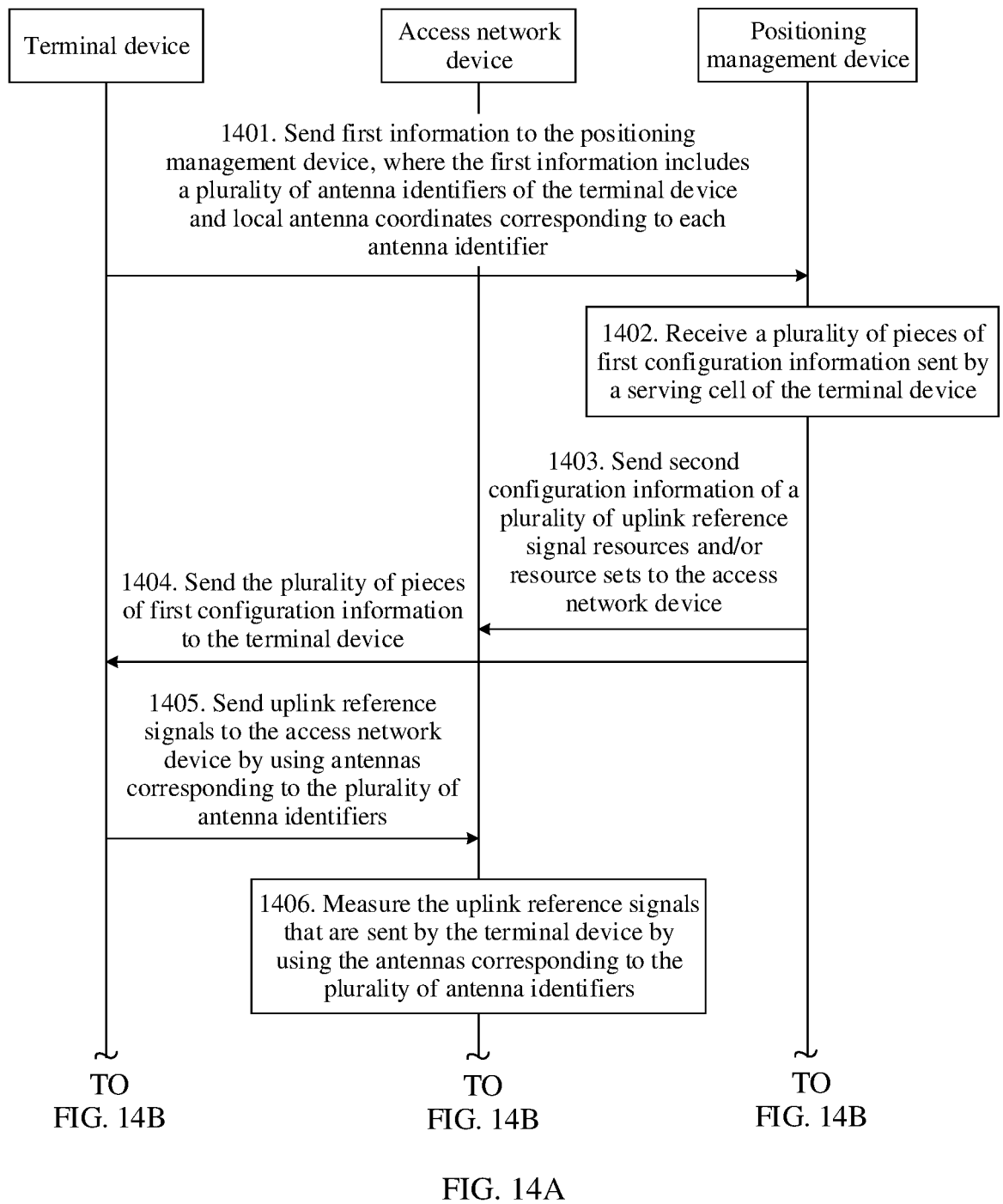

FIG. 14A and FIG. 14B are a schematic flowchart of another uplink positioning information determining method according to an embodiment. As shown in FIG. 14A and FIG. 14B, the uplink positioning information determining method includes the following step 1401 to step 1408.

1401. A terminal device sends first information to a positioning management device, where the first information includes a plurality of antenna identifiers of the terminal device and local antenna coordinates corresponding to each of the plurality of antenna identifiers. Correspondingly, the positioning management device may receive the first information sent by the terminal device.

For an implementation of step 1401, refer to the foregoing step 1301. Details are not described herein again.

1402. The positioning management device receives a plurality of pieces of first configuration information sent by a serving cell of the terminal device.

The plurality of pieces of first configuration information is used to configure a plurality of uplink reference signal resources and/or resource sets, and each piece of first configuration information includes an index of the uplink reference signal resource and/or resource set and an antenna identifier that is of the terminal device and that corresponds to the uplink reference signal resource and/or resource set. The antenna identifier that is of the terminal device and that corresponds to the uplink reference signal resource and/or resource set is an identifier of an antenna for sending an uplink reference signal on the uplink reference signal resource and/or resource set. In other words, the first configuration information implies a correspondence between an index of an uplink reference signal resource and/or resource set and an antenna identifier of the terminal device.

For example, the plurality of pieces of first configuration information is first configuration information 1 and first configuration information 2. The first configuration information 1 is used to configure an uplink reference signal resource 1. The first configuration information 1 includes an index of the uplink reference signal resource 1 and an antenna identifier 1 that is of the terminal device and that corresponds to the uplink reference signal resource 1. The first configuration information 2 is used to configure an uplink reference signal resource 2. The first configuration information 2 includes an index of the uplink reference signal resource 2 and an antenna identifier 2 that is of the terminal device and that corresponds to the uplink reference signal resource 2. For example, if an uplink reference signal is an SRS reference signal, an information element structure of the first configuration information 1 may be as follows:

Step 1402 may be performed before step 1401 or may be performed after step 1401. This is not limited in this embodiment.

1403. The positioning management device sends second configuration information of the plurality of uplink reference signal resources and/or resource sets to an access network device. Correspondingly, the access network device may receive the second configuration information that is of the plurality of uplink reference signal resources and/or resource sets and that is sent by the positioning management device.

Each piece of second configuration information includes an index of an uplink reference signal resource and/or resource set in the first configuration information. For example, the plurality of pieces of first configuration information is first configuration information 1 and first configu-

```
            SRS-Resource ::=              SEQUENCE {
            srs-ResourceId               SRS-ResourceId,
            nrofSRS-Ports                ENUMERATED {port1, ports2,
ports4},
            ptrs-PortIndex               ENUMERATED {n0, n1 }
OPTIONAL,   -- Need R
            transmissionComb             CHOICE {
              n2                         SEQUENCE {
                combOffset-n2                 INTEGER (0..1),
                cyclicShift-n2                INTEGER (0..7)
              },
              n4                         SEQUENCE {
                combOffset-n4                 INTEGER (0..3),
                cyclicShift-n4                INTEGER (0..11)
              }
            },
            resourceMapping              SEQUENCE {
              startPosition              INTEGER (0..5),
              nrofSymbols                ENUMERATED {n1, n2,
n4},
              repetitionFactor           ENUMERATED {n1, n2, n4}
            },
            freqDomainPosition           INTEGER (0..67),
            freqDomainShift              INTEGER (0..268),
            freqHopping                  SEQUENCE {
              c-SRS                           INTEGER (0..63),
              b-SRS                           INTEGER (0..3),
              b-hop                           INTEGER (0..3)
            },
            groupOrSequenceHopping       ENUMERATED { neither,
groupHopping, sequenceHopping },
            resource Type                CHOICE {
              aperiodic                       SEQUENCE {
                ...
              },
              semi-persistent                 SEQUENCE {
                periodicity AndOffset-sp
SRS-Periodicity AndOffset,
                ...
              },
              periodic                        SEQUENCE {
                periodicity AndOffset-p
SRS-Periodicity AndOffset,
                ...
              }
            },
            sequenceId                   INTEGER (0..1023),
            spatialRelationInfo                        SRS-SpatialRelationInfo
OPTIONAL,   -- Need R
            ...,
            [[
            tx-ID                        INTEGER (0..3)     OPTIONAL
            ]]
            }
``` srs-ResourceId tx-ID is the index of the uplink reference signal resource 1, and tx-ID is the antenna identifier 1 of the terminal device. An information element structure of the second configuration information 2 is similar, and details are not described herein.

ration information 2. The first configuration information 1 includes an index of the uplink reference signal resource 1 and an antenna identifier 1 that is of the terminal device and that corresponds to the uplink reference signal resource 1. The first configuration information 2 includes an index of the uplink reference signal resource 2 and an antenna identifier 2 that is of the terminal device and that corresponds to the uplink reference signal resource 2. In this case, the positioning management device sends the second configuration information 1 and the second configuration information 2 to the access network device. The second configuration information 1 includes the index of the uplink reference signal resource 1. The second configuration information 2 includes the index of the uplink reference signal resource 2.

Optionally, the second configuration information may alternatively be the same as the first configuration information.

1404. The positioning management device sends the plurality of pieces of first configuration information to the terminal device. Correspondingly, the terminal device may receive the plurality of pieces of first configuration information sent by the positioning device.

Step 1404 may be performed before steps 1401 to 1403 or may be performed after steps 1401 to 1403. This is not limited in this embodiment.

In a possible implementation, step 1404 may not be performed, and the serving cell of the terminal device may send the plurality of pieces of first configuration information to the terminal device. Correspondingly, the terminal device may receive the plurality of pieces of first configuration information sent by the serving cell of the terminal device.

In a possible implementation, step 1402 may not be performed. The positioning management device may generate the plurality of pieces of first configuration information. After generating the plurality of pieces of first configuration information, the positioning management device may send the second configuration information of the plurality of uplink reference signal resources and/or resource sets to the access network device and send the plurality of pieces of first configuration information to the terminal device. In this possible implementation, the positioning management device needs to obtain, from the serving cell of the terminal device in advance, a plurality of pieces of configuration information used to configure the plurality of uplink reference signal resources and/or resource sets, and the positioning management device generates the plurality of pieces of first configuration information based on the plurality of pieces of configuration information and the antenna identifiers in the first information. For example, the plurality of pieces of configuration information obtained by the positioning management device from the serving cell of the terminal device include configuration information 1 and configuration information 2. The configuration information 1 is used to configure an uplink reference signal resource 1 and/or resource set 1, and the configuration information 1 includes an index of the uplink reference signal resource 1 and/or resource set 1. The configuration information 2 is used to configure an uplink reference signal resource 2 and/or resource set 2, and the configuration information 2 includes an index of the uplink reference signal resource 2 and/or resource set 2. The first information includes: {antenna identifier 1, local coordinates of the antenna 1=(−0.5, 0.5)} and {antenna identifier 2, local coordinates of the antenna 2=(0.5, −0.5)}. In this case, the positioning management device may generate the first configuration information 1 and the first configuration information 2. The first configuration information 1 includes the antenna identifier 1 and the index of the uplink reference signal resource 1 and/or resource set 1. The first configuration information 2 includes the antenna identifier 2 and the index of the uplink reference signal resource 2 and/or resource set 2.

1405. The terminal device sends uplink reference signals to the access network device by using antennas corresponding to the plurality of antenna identifiers.

In this embodiment, after receiving the plurality of pieces of first configuration information, the terminal device may send the uplink reference signals based on the first configuration information; or after receiving the plurality of pieces of first configuration information, the terminal device may send the uplink reference signals not based on the first configuration information, and the terminal device may determine, based on a requirement of the terminal device, an antenna for sending a reference signal on an uplink reference signal resource. In other words, the first configuration information may be used to forcibly require the terminal device to send the uplink reference signals based on the first configuration information. Alternatively, the first configuration information is only used to recommend, to the terminal device, an antenna for sending a reference signal on an uplink reference signal resource, and an antenna used by the terminal device for sending the reference signal on the uplink reference signal resource is determined by the terminal device based on a requirement of the terminal device. Therefore, according to step 1402 to step 1404, an antenna for sending an uplink reference signal on an uplink reference signal resource or resource set can be required or recommended to the terminal device.

In a possible implementation, an implementation in which the terminal device sends the uplink reference signals to the access network device by using the antennas corresponding to the plurality of antenna identifiers is: The terminal device sends, based on the plurality of pieces of first configuration information, the uplink reference signals to the access network device on corresponding uplink reference signal resources and/or resource sets by using the antennas corresponding to the plurality of antenna identifiers. Correspondingly, an implementation in which the positioning management device determines the positioning information of the terminal device based on the first information and the measurement information is: The positioning management device determines an antenna identifier that is of the terminal device and that corresponds to each measurement result based on the plurality of pieces of first configuration information and the index that is of the uplink reference signal resource and/or resource set and that corresponds to each measurement result. The positioning management device determines the positioning information of the terminal device based on the first information, each measurement result, and the antenna identifier that is of the terminal device and that corresponds to each measurement result.

In this possible implementation, the first configuration information is used to forcibly require the terminal device to send the uplink reference signal based on the first configuration information. Therefore, the terminal device sends, based on the plurality of pieces of first configuration information, the uplink reference signals to the access network device on corresponding uplink reference signal resources and/or resource sets by using the antennas corresponding to the plurality of antenna identifiers. Based on this possible implementation, the antenna identifier that is of the terminal device and that corresponds to each measurement result can be accurately determined.

For example, the first configuration information 1 includes the antenna identifier 1 and the index of the uplink reference signal resource 1 and/or resource set 1. The first configuration information 2 includes the antenna identifier 2 and the index of the uplink reference signal resource 2 and/or resource set 2. The terminal device sends an uplink reference signal on the uplink reference signal resource 1 and/or resource set 1 by using the antenna 1 corresponding to the antenna identifier 1. The terminal device sends an uplink reference signal on the uplink reference signal resource 2 and/or resource set 2 by using the antenna 2 corresponding to the antenna identifier 2. The access network device measures the uplink reference signal on the uplink reference signal resource 1 and/or resource set 1, to obtain a measurement result 1. The access network device measures the uplink reference signal on the uplink reference signal resource 2 and/or resource set 2, to obtain a measurement result 2. The measurement information sent by the access network device to the positioning management device includes: {index of the uplink reference signal resource 1 and/or resource set 1, measurement result 1} and {index of the uplink reference signal resource 2 and/or the resource set 2, measurement result 2}. After receiving the measurement information, the positioning management device may determine, based on the first configuration information 1 and {index of the uplink reference signal resource 1 and/or resource set 1, measurement result 1}, that the measurement result 1 corresponds to the antenna identifier 1. The measurement result 1 may be obtained by measuring the reference signal sent by the antenna 1 corresponding to the antenna identifier 1. Similarly, the positioning management device may determine, based on the first configuration information 2 and {index of the uplink reference signal resource 2 and/or resource set 2, measurement result 2}, that the measurement result 2 corresponds to the antenna identifier 2. The measurement result 2 may be obtained by measuring the reference signal sent by the antenna 2 corresponding to the antenna identifier 2. The positioning management device determines the positioning information of the terminal device based on the first information, the measurement result 1, the antenna identifier 1 corresponding to the measurement result 1, the measurement result 2, and the antenna identifier 2 corresponding to the measurement result 2.

In a possible implementation, the terminal device may further report second information to the positioning management device, where the second information includes an index that is of an uplink reference signal resource or resource set and that is sent by the terminal device, and an antenna identifier that is of the terminal device and that corresponds to the uplink reference signal resource and/or resource set sent by the terminal device. Correspondingly, the positioning management device may further receive second information reported by the terminal device, where the second information includes the index that is of the uplink reference signal resource or resource set and that is sent by the terminal device, and the antenna identifier that is of the terminal device, that corresponds to the uplink reference signal resource and/or resource set, and that is sent by the terminal device; and an implementation in which the positioning management device determines the positioning information of the terminal device based on the first information and the measurement information is: The positioning management device determines, based on the second information and the index that is of the uplink reference signal resource and/or resource set that corresponds to each measurement result, an antenna identifier that is of the terminal device and that corresponds to each measurement result; and the positioning management device determines the positioning information of the terminal device based on the first information, each measurement result, and the antenna identifier that is of the terminal device and that corresponds to each measurement result.

In this possible implementation, the second information indicates an antenna actually used by the terminal device for sending the reference signal on the uplink reference signal resource. The first configuration information is only used to recommend, to the terminal device, an antenna for sending a reference signal on an uplink reference signal resource, and an antenna used by the terminal device for sending the reference signal on the uplink reference signal resource is determined by the terminal device based on a requirement of the terminal device. Therefore, after sending the uplink reference signal by using the antennas corresponding to the plurality of antenna identifiers, the terminal device needs to send the second information. In this way, the positioning management device can determine the antenna actually used by the terminal device for sending the reference signal on the uplink reference signal resource, and subsequently can accurately determine, based on the second information, the antenna identifier that is of the terminal device and that corresponds to each measurement result reported by the access network device. An implementation principle in which the positioning management device determines, based on the second information and the index that is of the uplink reference signal resource and/or resource set and that corresponds to each measurement result, the antenna identifier that is of the terminal device and that corresponds to each measurement result is the same as the foregoing implementation principle in which the positioning management device determines, based on the first configuration information and the index that is of the uplink reference signal resource and/or resource set and that corresponds to each measurement result, the antenna identifier that is of the terminal device and that corresponds to each measurement result. Details are not described herein again. It should be noted that, when step 1402 to step 1404 are not performed, the terminal device may alternatively report the second information to the positioning management device.

In a possible implementation, the absolute coordinates of the terminal device are the absolute coordinates of the reference point of the terminal device, the reference point is not an antenna of the terminal device, and an implementation in which the positioning management device determines the absolute coordinates of the terminal device based on the first information, each measurement result, and the antenna identifier that is of the terminal device and that corresponds to each measurement result is: The positioning management device determines an absolute location corresponding to the antenna identifier based on each measurement result, the antenna identifier that is of the terminal device and that corresponds to each measurement result, the antenna identifier in the first information, and the local antenna coordinates of the antenna identifier; and the positioning management device determines the absolute coordinates of the reference point based on the absolute location corresponding to the antenna identifier, the local antenna coordinates corresponding to the antenna identifier, and the local coordinates of the reference point. For an implementation, refer to the descriptions in the embodiment corresponding to FIG. 9. Details are not described herein again.

In a possible implementation, the absolute coordinates of the terminal device are the absolute coordinates of the reference point of the terminal device, the reference point is an antenna of the terminal device, the measurement information includes a measurement result corresponding to the reference point, and an implementation in which the positioning management device determines the absolute coordinates of the terminal device based on the first information, each measurement result, and the antenna identifier that is of the terminal device and that corresponds to each measurement result is: The positioning management device determines absolute coordinates corresponding to the antenna identifier and the absolute coordinates of the reference point based on each measurement result, the antenna identifier that is of the terminal device and that corresponds to each measurement result, the local coordinates of the reference point, the antenna identifier in the first information, and the local antenna coordinates of the antenna identifier. For an implementation, refer to the descriptions in the embodiment corresponding to FIG. 9. Details are not described herein again.

In a possible implementation, the positioning management device may determine the orientation or posture information of the terminal device, the rotation angle, and/or the uptilt and downtilt angles of the terminal device based on the first information, the plurality of measurement results, and the antenna identifier that is of the terminal device and that corresponds to each measurement result. The positioning management device may determine an absolute location corresponding to the antenna identifier based on each measurement result, the antenna identifier that is of the terminal device and that corresponds to each measurement result, the antenna identifier in the first information, and the local antenna coordinates of the antenna identifier; and the positioning management device determines the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier. For an implementation, refer to the descriptions in the embodiment corresponding to FIG. 9. Details are not described herein again.

1406. The access network device measures the uplink reference signals that are sent by the terminal device by using the antennas corresponding to the plurality of antenna identifiers.

1407. The access network device sends the measurement information to the positioning management device, where the measurement information includes a plurality of measurement results of the uplink reference signals and an index of an uplink reference signal resource and/or resource set corresponding to each measurement result.

1408. The positioning management device determines positioning information of the terminal device based on the first information and the measurement information, where the positioning information includes one or more of the following information: absolute coordinates of the terminal device, orientation or posture information of the terminal device, a rotation angle of the terminal device, and uptilt and downtilt angles of the terminal device.

Figure 15:
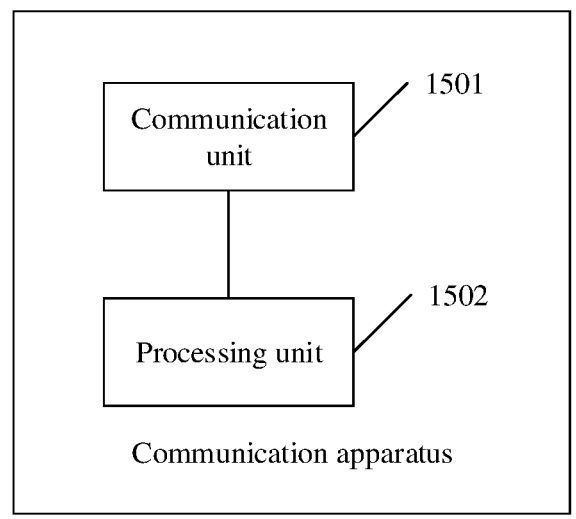
FIG. 15 is a schematic structural diagram of a communication apparatus according to an embodiment.

FIG. 15 is a schematic structural diagram of a communication apparatus according to an embodiment. The communication apparatus shown in FIG. 15 may be configured to implement some or all functions of the positioning management device in the embodiment corresponding to the foregoing downlink positioning information determining method. The communication apparatus shown in FIG. 15 may be configured to implement some or all functions of the positioning management device in the method embodiments described in FIG. 9 to FIG. 12. The apparatus may be a positioning management device, may be an apparatus in the positioning management device, or may be an apparatus that can be used together with the positioning management device. The communication apparatus may alternatively be a chip system. The communication apparatus shown in FIG. 15 may include a communication unit 1501 and a processing unit 1502.

The communication unit 1501 is configured to receive first information sent by a terminal device, where the first information includes a plurality of antenna identifiers of the terminal device and local antenna coordinates corresponding to each antenna identifier. The communication unit 1501 is further configured to receive measurement information sent by the terminal device, where the measurement information includes the plurality of antenna identifiers of the terminal device and a measurement result that is of a downlink reference signal and that corresponds to each antenna identifier. The processing unit 1502 is configured to determine positioning information of the terminal device based on the first information and the measurement information, where the positioning information includes one or more of the following information: absolute coordinates of the terminal device, orientation or posture information of the terminal device, a rotation angle of the terminal device, or uptilt and downtilt angles of the terminal device.

In a possible implementation, the first information further includes local coordinates of a reference point of the terminal device and/or an antenna identifier that is of the terminal device and that corresponds to the reference point, and the absolute coordinates of the terminal device are absolute coordinates of the reference point of the terminal device.

In a possible implementation, the communication unit 1501 may receive the first information sent by the terminal device. It may receive a positioning capability message of the terminal device sent by the terminal device, where the positioning capability message of the terminal device carries the first information, and the positioning capability message indicates that the terminal device has a capability of determining the positioning information by using a plurality of antennas.

In a possible implementation, after the communication unit 1501 receives the positioning capability message of the terminal device sent by the terminal device, and before the communication unit 1501 receives the measurement information sent by the terminal device, the communication unit 1501 is further configured to send a report request to the terminal device, where the report request requests to report the measurement information.

In a possible implementation, before receiving the measurement information sent by the terminal device, the communication unit 1501 is further configured to receive a positioning capability message of the terminal device sent by the terminal device, where the positioning capability message indicates that the terminal device has a capability of determining the positioning information by using a plurality of antennas.

In a possible implementation, after receiving the positioning capability message of the terminal device sent by the terminal device, the communication unit 1501 is further configured to send a report request to the terminal device, where the report request requests to report the measurement information and the first information.

In a possible implementation, the absolute coordinates of the terminal device are the absolute coordinates of the reference point of the terminal device, the reference point is not an antenna of the terminal device, and a manner in which the processing unit 1502 determines the absolute coordinates of the terminal device based on the first information and the measurement information includes: determining absolute coordinates corresponding to the antenna identifier based on the measurement information, the antenna identifier in the first information, and the local antenna coordinates of the antenna identifier; and determining the absolute coordinates of the reference point based on the absolute coordinates corresponding to the antenna identifier, the local antenna coordinates corresponding to the antenna identifier, and the local coordinates of the reference point;

or the absolute coordinates of the terminal device are the absolute coordinates of the reference point of the terminal device, the reference point is an antenna of the terminal device, the measurement information includes a measurement result corresponding to the reference point, and a manner in which the processing unit 1502 determines the absolute coordinates of the terminal device based on the first information and the measurement information is: determining absolute coordinates corresponding to the antenna identifier and the absolute coordinates of the reference point based on the measurement information, the local coordinates of the reference point, the antenna identifier in the first information, and the local antenna coordinates of the antenna identifier.

In a possible implementation, the processing unit 1502 may determine the orientation or posture information of the terminal device, the rotation angle, and/or the uptilt and downtilt angles of the terminal device based on antenna information and the measurement information. It may determine an absolute location corresponding to the antenna identifier based on the measurement information, the antenna identifier in the first information, and the local antenna coordinates of the antenna identifier; and determining the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier.

FIG. 15 is a schematic structural diagram of a communication apparatus according to an embodiment. The communication apparatus shown in FIG. 15 may be configured to implement some or all functions of the terminal device in the embodiment corresponding to the foregoing downlink positioning information determining method. The communication apparatus shown in FIG. 15 may be configured to implement some or all functions of the terminal device in the method embodiments described in FIG. 9 to FIG. 12. The apparatus may be a terminal device, an apparatus in the terminal device, or an apparatus that can be used together with the terminal device. The communication apparatus may alternatively be a chip system. The communication apparatus shown in FIG. 15 may include a communication unit 1501 and a processing unit 1502. The processing unit 1502 is configured to perform a data processing operation.

The communication unit 1501 is configured to send first information to a positioning management device, where the first information includes a plurality of antenna identifiers of the communication apparatus and local antenna coordinates corresponding to each antenna identifier. The communication unit 1501 is further configured to measure, by using antennas corresponding to the plurality of antenna identifiers, downlink reference signals sent by an access network device. The communication unit 1501 is further configured to send measurement information to the positioning management device, where the measurement information includes the plurality of antenna identifiers of the communication apparatus and a measurement result that is of a downlink reference signal and that corresponds to each antenna identifier.

In a possible implementation, the first information further includes local coordinates of a reference point of the communication apparatus and/or an antenna identifier that is of the communication apparatus and that corresponds to the reference point, and absolute coordinates of the reference point of the communication apparatus are absolute coordinates of the communication apparatus.

In a possible implementation, a manner in which the communication unit 1501 sends the first information to the positioning management device may be:

sending a positioning capability message of the communication apparatus to the positioning management device, where the positioning capability message of the communication apparatus carries the first information, and the positioning capability message indicates that the communication apparatus has a capability of determining positioning information by using a plurality of antennas.

In a possible implementation, after sending the positioning capability message of the communication apparatus to the positioning management device, and before measuring, by using the antennas corresponding to the plurality of antenna identifiers, the downlink reference signals sent by the access network device, the communication unit 1501 is further configured to receive a report request sent by the positioning management device, where the report request requests to report the measurement information.

In a possible implementation, before measuring, by using the antennas corresponding to the plurality of antenna identifiers, the downlink reference signals sent by the access network device, the communication unit 1501 is further configured to send a positioning capability message of the communication apparatus to the positioning management device, where the positioning capability message indicates that the communication apparatus has a capability of determining positioning information by using a plurality of antennas.

In a possible implementation, after sending the positioning capability message of the communication apparatus to the positioning management device, the communication unit 1501 is further configured to receive a report request sent by the positioning management device, where the report request requests to report the measurement information and the first information.

FIG. 15 is a schematic structural diagram of a communication apparatus according to an embodiment. The communication apparatus shown in FIG. 15 may be configured to implement some or all functions of the positioning management device in the embodiment corresponding to the foregoing uplink positioning information determining method. The communication apparatus shown in FIG. 15 may be configured to implement some or all functions of the positioning management device in the method embodiments described in FIG. 13 to FIG. 14B. The apparatus may be a positioning management device, may be an apparatus in the positioning management device, or may be an apparatus that can be used together with the positioning management device. The communication apparatus may alternatively be a chip system. The communication apparatus shown in FIG. 15 may include a communication unit 1501 and a processing unit 1502.

The communication unit 1501 is configured to receive first information sent by a terminal device, where the first information includes a plurality of antenna identifiers of the terminal device and local antenna coordinates corresponding to each antenna identifier. The communication unit 1501 is further configured to receive measurement information sent by an access network device, where the measurement information includes indexes of a plurality of uplink reference signal resources and/or resource sets and a measurement result corresponding to the index of each uplink reference signal resource and/or resource set. The processing unit 1502 is configured to determine positioning information of the terminal device based on the first information and the measurement information, where the positioning information includes one or more of the following information: absolute coordinates of the terminal device, orientation or posture information of the terminal device, a rotation angle of the terminal device, and uptilt and downtilt angles of the terminal device.

In a possible implementation, the first information further includes local coordinates of a reference point of the terminal device and/or an antenna identifier that is of the terminal device and that corresponds to the reference point, and the absolute coordinates of the terminal device are absolute coordinates of the reference point of the terminal device.

In a possible implementation, before receiving the measurement information sent by the access network device, the communication unit 1501 is further configured to receive a positioning capability message of the terminal device sent by the terminal device, where the positioning capability message of the terminal device carries the first information, and the positioning capability message indicates that the terminal device has a capability of determining the positioning information by using a plurality of antennas.

In a possible implementation, before the processing unit 1502 determines the positioning information of the terminal device based on the first information and the measurement information, the communication unit 1501 is further configured to receive a plurality of pieces of first configuration information sent by a serving cell of the terminal device, where the plurality of pieces of first configuration information is used to configure the plurality of uplink reference signal resources and/or resource sets, and each piece of first configuration information includes the index of the uplink reference signal resource and/or resource set and an antenna identifier that is of the terminal device and that corresponds to the uplink reference signal resource and/or resource set. The communication unit 1501 is further configured to send second configuration information of the plurality of uplink reference signal resources and/or resource sets to the access network device, where each piece of the second configuration information includes the index of the uplink reference signal resource and/or resource set.

In a possible implementation, the communication unit 1501 is further configured to send the first configuration information of the plurality of uplink reference signal resources and/or resource sets to the terminal device.

In a possible implementation, before the processing unit 1502 determines the positioning information of the terminal device based on the first information and the measurement information, the communication unit 1501 is further configured to generate a plurality of pieces of first configuration information, where the plurality of pieces of first configuration information is used to configure the plurality of uplink reference signal resources and/or resource sets, and each piece of first configuration information includes the index of the uplink reference signal resource and/or resource set and an antenna identifier that is of the terminal device and that corresponds to the uplink reference signal resource and/or resource set. The communication unit 1501 is further configured to send second configuration information of the plurality of uplink reference signal resources and/or resource sets to the access network device, where each piece of the second configuration information includes the index of the uplink reference signal resource and/or resource set. The communication unit 1501 is further configured to send the first configuration information of the plurality of uplink reference signal resources and/or resource sets to the terminal device.

In a possible implementation, a manner in which the processing unit 1502 determines the positioning information of the terminal device based on the first information and the measurement information may be: determining an antenna identifier that is of the terminal device and that corresponds to each measurement result based on the plurality of pieces of first configuration information and the index that is of the uplink reference signal resource and/or resource set and that corresponds to each measurement result; and determining the positioning information of the terminal device based on the first information, each measurement result, and the antenna identifier that is of the terminal device and that corresponds to each measurement result.

In a possible implementation, the communication unit 1501 is further configured to receive second information reported by the terminal device, where the second information includes the index that is of the uplink reference signal resource or resource set and that is sent by the terminal device, and the antenna identifier that is of the terminal device, that corresponds to the uplink reference signal resource and/or resource set, and that is sent by the terminal device; and a manner in which the processing unit 1502 determines the positioning information of the terminal device based on the first information and the measurement information may be: determining an antenna identifier that is of the terminal device and that corresponds to each measurement result based on the second information and the index that is of the uplink reference signal resource and/or resource set that corresponds to each measurement result; and determining the positioning information of the terminal device based on the first information, each measurement result, and the antenna identifier that is of the terminal device and that corresponds to each measurement result.

In a possible implementation, the absolute coordinates of the terminal device are the absolute coordinates of the reference point of the terminal device, the reference point is not an antenna of the terminal device, and a manner in which the processing unit 1502 determines the absolute coordinates of the terminal device based on the first information, each measurement result, and the antenna identifier that is of the terminal device and that corresponds to each measurement result may be: determining an absolute location corresponding to the antenna identifier based on each measurement result, the antenna identifier that is of the terminal device and that corresponds to each measurement result, the antenna identifier in the first information, and the local antenna coordinates of the antenna identifier; and determining the absolute coordinates of the reference point based on the absolute location corresponding to the antenna identifier, the local antenna coordinates corresponding to the antenna identifier, and the local coordinates of the reference point;
or
the absolute coordinates of the terminal device are the absolute coordinates of the reference point of the terminal device, the reference point is an antenna of the terminal device, the measurement information includes a measurement result corresponding to the reference point, and a manner in which the processing unit 1502 determines the absolute coordinates of the terminal device based on the first information, each measurement result, and the antenna identifier that is of the terminal device and that corresponds to each measurement result may be: determining absolute coordinates corresponding to the antenna identifier and the absolute coordinates of the reference point based on each measurement result, the antenna identifier that is of the terminal device and that corresponds to each measurement result, the local coordinates of the reference point, the antenna identifier in the first information, and the local antenna coordinates of the antenna identifier.

In a possible implementation, a manner in which the processing unit 1502 determines the orientation or posture information of the terminal device, the rotation angle, and/or the uptilt and downtilt angles of the terminal device based on the first information, the plurality of measurement results, and the antenna identifier that is of the terminal device and that corresponds to each measurement result may be: determining an absolute location corresponding to the antenna identifier based on each measurement result, the antenna identifier that is of the terminal device and that corresponds to each measurement result, the antenna identifier in the first information, and the local antenna coordinates of the antenna identifier; and determining the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier.

FIG. 15 is a schematic structural diagram of a communication apparatus according to an embodiment. The communication apparatus shown in FIG. 15 may be configured to implement some or all functions of the terminal device in the embodiment corresponding to the foregoing downlink positioning information determining method. The communication apparatus shown in FIG. 15 may be configured to implement some or all functions of the terminal device in the method embodiments described in FIG. 9 to FIG. 12. The apparatus may be a terminal device, an apparatus in the terminal device, or an apparatus that can be used together with the terminal device. The communication apparatus may alternatively be a chip system. The communication apparatus shown in FIG. 15 may include a communication unit 1501 and a processing unit 1502. The processing unit 1502 is configured to perform a data processing operation.

The communication unit 1501 is configured to send first information to a positioning management device, where the first information includes a plurality of antenna identifiers of the communication apparatus and local antenna coordinates corresponding to each antenna identifier. The communication unit 1501 is further configured to send uplink reference signals to an access network device by using antennas corresponding to the plurality of antenna identifiers.

In a possible implementation, the first information further includes local coordinates of a reference point of the communication apparatus and/or an antenna identifier that is of the communication apparatus and that corresponds to the reference point, and absolute coordinates of the reference point of the communication apparatus are absolute coordinates of the communication apparatus.

In a possible implementation, a manner in which the communication unit 1501 sends the first information to the positioning management device may be: sending a positioning capability message of the communication apparatus to the positioning management device, where the positioning capability message of the communication apparatus carries the first information, and the positioning capability message indicates that the communication apparatus has a capability of determining positioning information by using a plurality of antennas.

In a possible implementation, after sending the first information to the positioning management device, and before sending the uplink reference signals to the access network device by using the antennas corresponding to the plurality of antenna identifiers, the communication unit 1501 is further configured to receive a plurality of pieces of first configuration information sent by a serving cell of the communication apparatus or the positioning management device, where the plurality of pieces of first configuration information is used to configure a plurality of uplink reference signal resources and/or resource sets, and each piece of first configuration information includes an index of the uplink reference signal resource and/or resource set and an antenna identifier that is of the communication apparatus and that corresponds to the uplink reference signal resource and/or resource set.

In a possible implementation, a manner in which the communication unit 1501 sends the uplink reference signals to the access network device by using the antennas corresponding to the plurality of antenna identifiers may be: sending, based on the plurality of pieces of first configuration information, the uplink reference signals to the access network device on corresponding uplink reference signal resources and/or resource sets by using the antennas corresponding to the plurality of antenna identifiers.

In a possible implementation, after sending the uplink reference signals to the access network device by using the antennas corresponding to the plurality of antenna identifiers, the communication unit 1501 is further configured to report second information to the positioning management device, where the second information includes an index that is of an uplink reference signal resource or resource set and that is sent by the communication apparatus, and an antenna identifier that is of the communication apparatus and that corresponds to the uplink reference signal resource and/or resource set sent by the communication apparatus.

Figure 16A:
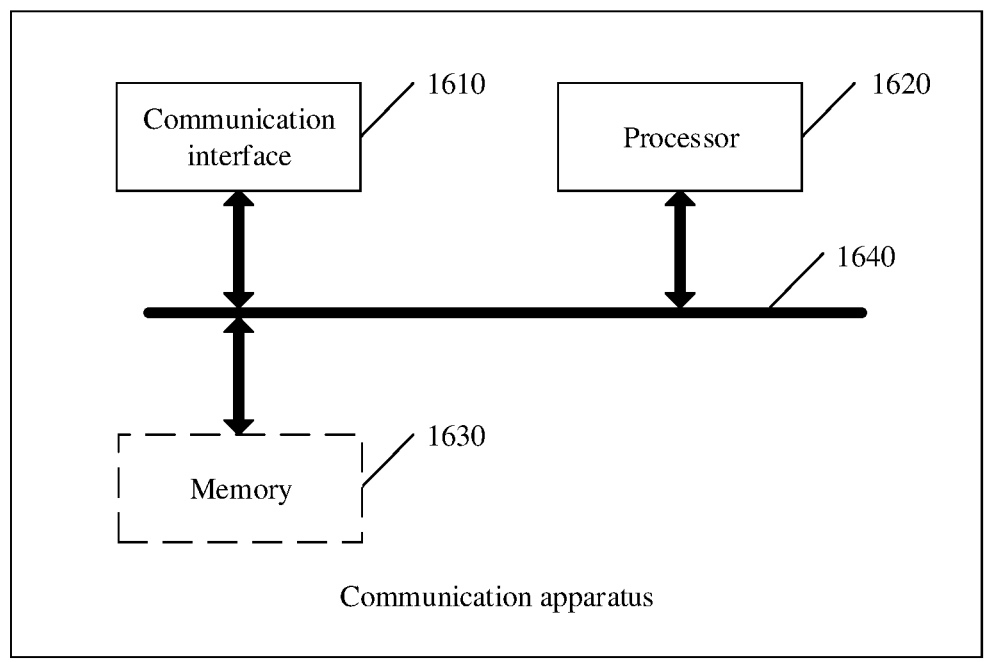
FIG. 16*a* is a schematic structural diagram of another communication apparatus according to an embodiment.

FIG. 16a shows a communication apparatus 160 according to an embodiment, to implement functions of the terminal device or the positioning management device in the foregoing uplink positioning information determining method or downlink positioning information determining method. The apparatus may be a terminal device or an apparatus used in the terminal device. The apparatus used in the terminal device may be a chip system or a chip in the terminal device. Alternatively, the apparatus may be a positioning management device or an apparatus used in the positioning management device. The apparatus used in the positioning management device may be a chip system or a chip in the positioning management device. The chip system may include a chip or may include a chip and another discrete component.

The communication apparatus 160 includes at least one processor 1620, configured to implement a data processing function of the terminal device or the positioning management device in the methods provided in the embodiments. The apparatus 160 may further include a communication interface 1610, configured to implement receiving and sending operations of the terminal device or the positioning management device in the methods provided in the embodiments. In the embodiments, the communication interface may be a transceiver, a circuit, a bus, a module, or a communication interface of another type, and is configured to communicate with another device by using a transmission medium. For example, the communication interface 1610 is used by an apparatus in the apparatus 160 to communicate with another device. The processor 1620 receives and sends data through the communication interface 1610 and is configured to implement the methods in the foregoing method embodiments.

The apparatus 160 may further include at least one memory 1630, configured to store program instructions and/or data. The memory 1630 is coupled to the processor 1620. The coupling in this embodiment may be an indirect coupling or a communication connection between apparatuses, units, or modules in an electrical form, a mechanical form, or another form, and is used for information exchange between the apparatuses, the units, or the modules. The processor 1620 may cooperate with the memory 1630. The processor 1620 may execute the program instructions stored in the memory 1630. At least one of the at least one memory may be included in the processor.

A connection medium between the communication interface 1610, the processor 1620, and the memory 1630 is not limited in this embodiment. In this embodiment, the memory 1630, the processor 1620, and the communication interface 1610 are connected through a bus 1640 in FIG. 16*a*. The bus is represented by using a thick line in FIG. 16*a*. The foregoing is merely an example for description. A connection manner between other components is not limited thereto. The bus may be classified into an address bus, a data bus, a control bus, and the like. For ease of representation, only one thick line is used to represent the bus in FIG. 16*a*, but this does not mean that there is only one bus or only one type of bus.

When the apparatus 160 is an apparatus used in the terminal device or the positioning management device, for example, when the apparatus 160 is a chip or a chip system, the communication interface 1610 may output or receive a baseband signal. When the apparatus 160 is the terminal device or the positioning management device, the communication interface 1610 may output or receive a radio frequency signal. In the embodiments, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams in the embodiments. The general purpose processor may be a microprocessor or any conventional processor or the like. The steps of the methods with reference to the embodiments may be directly performed by a hardware processor or may be performed by using a combination of hardware in the processor and a software module.

Figure 16B:
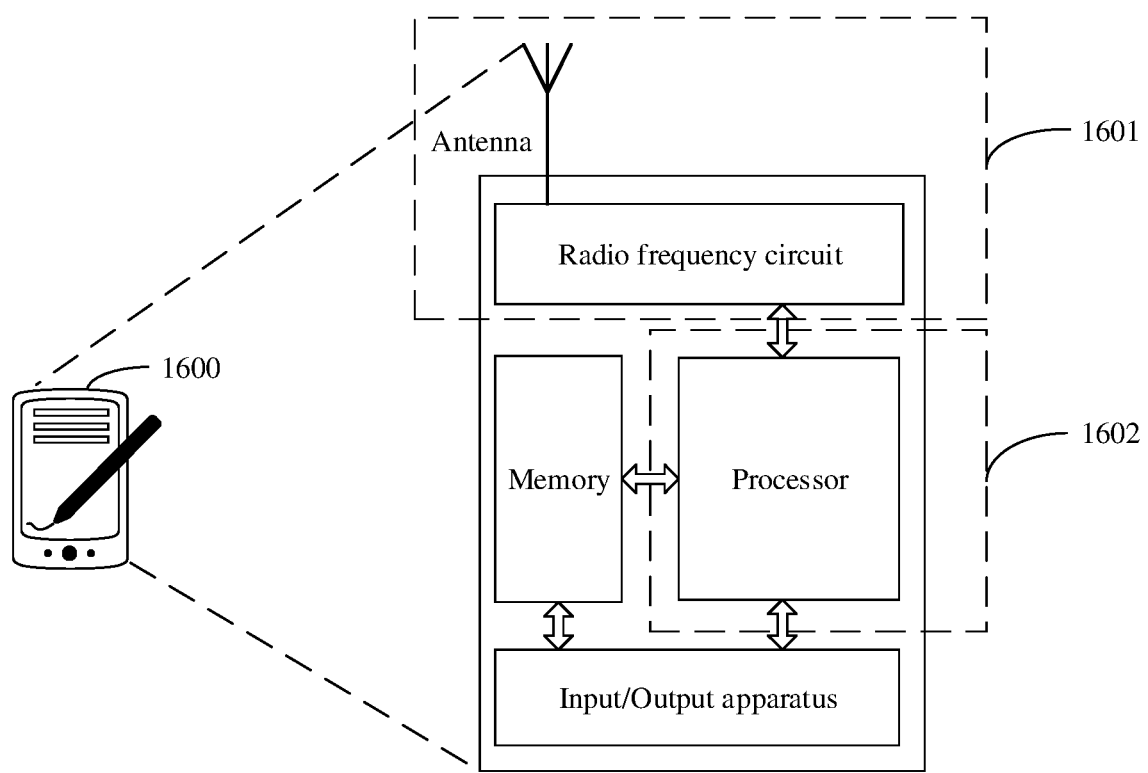
FIG. 16*b* is a schematic structural diagram of still another communication apparatus according to an embodiment.

For example, FIG. 16*b* is a schematic structural diagram of another terminal device 1600 according to an embodiment. The terminal device may perform an operation performed by the terminal device in the uplink positioning information determining method or the downlink positioning information determining method.

For ease of description, FIG. 16*b* shows only main components of the terminal device. As shown in FIG. 16*b*, the terminal device 1600 includes a processor, a memory, a radio frequency circuit, an antenna, and an input/output apparatus. The processor is configured to: process a communication protocol and communication data, control the entire terminal device, execute a software program, and process data of the software program, for example, configured to support the terminal device in performing the procedure described in FIG. 9 to FIG. 14B. The memory is configured to store the software program and data. The radio frequency circuit is configured to: perform conversion between a baseband signal and a radio frequency signal and process the radio frequency signal. The antenna is configured to receive and send a radio frequency signal in a form of an electromagnetic wave. The terminal device 1600 may further include an input/output apparatus, for example, a touchscreen, a display screen, or a keyboard. The input/output apparatus is configured to: receive data entered by a user, and output data to the user. It should be noted that some types of terminal devices may have no input/output apparatus.

After the terminal device is powered on, the processor may read the software program in a storage unit, interpret and execute the data of the software program, and process the data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 16*b* shows only one memory and one processor. In an actual terminal device, there may be a plurality of processors and memories. The memory may also be referred to as a storage medium, a storage device, or the like. This is not limited in the embodiments.

In an optional implementation, the processor may include a baseband processor and a central processing unit (CPU). The baseband processor is configured to process a communications protocol and communications data. The CPU is configured to control the entire terminal device, execute a software program, and process data of the software program. Optionally, the processor may alternatively be a network processor (NP) or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The memory may include a volatile memory, for example, a random access memory (RAM). The memory may alternatively include a non-volatile memory, for example, a flash memory, a hard disk drive (HDD), or a solid-state drive (SSD). The memory may alternatively include a combination of the foregoing types of memories.

For example, in this embodiment, as shown in FIG. 16*b*, the antenna and the radio frequency circuit that have a transceiver function may be considered as a communication unit 1601 of the terminal device 1600, and the processor having a processing function may be considered as a processing unit 1602 of the terminal device 1600.

The communication unit 1601 may also be referred to as a transceiver, a transceiver, a transceiver apparatus, a transceiver unit, or the like, and is configured to implement the sending and receiving functions. Optionally, a component that is in the communication unit 1601 and that is configured to implement the receiving function may be considered as a receiving unit, and a component that is in the communication unit 1601 and that is configured to implement the sending function may be considered as a sending unit. In other words, the communication unit 1601 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

In some embodiments, the communication unit 1601 and the processing unit 1602 may be integrated into one component or may be separated as different components. In addition, the processor and the memory may be integrated into one component or may be separated as different components.

The communication unit 1601 may be configured to perform receiving and sending operations of the terminal device in the foregoing method embodiments. The processing unit 1602 may be configured to perform a data processing operation of the terminal device in the foregoing method embodiments.

An embodiment may further provide a non-transitory computer-readable storage medium. The non-transitory computer-readable storage medium stores computer-executable instructions. When the computer-executable instructions are executed, the method performed by the terminal device in the foregoing method embodiments is implemented.

An embodiment may further provide a non-transitory computer-readable storage medium. The non-transitory computer-readable storage medium stores computer-executable instructions. When the computer-executable instructions are executed, the method performed by the positioning management device in the foregoing method embodiments is implemented.

An embodiment may further provide a computer program product. The computer program product includes a computer program. When the computer program is executed, the method performed by the terminal device in the foregoing method embodiments is implemented.

An embodiment may further provide a computer program product. The computer program product includes a computer program. When the computer program is executed, the method performed by the positioning management device in the foregoing method embodiments is implemented.

An embodiment may further provide a communication system. The communication system includes a terminal device and a positioning management device. The terminal device is configured to perform the method performed by the terminal device in the foregoing method embodiments. The positioning management device is configured to perform the method performed by the positioning management device in the foregoing method embodiments.

It should be noted that, for brief description, the foregoing method embodiments are represented as a series of actions. However, a person skilled in the art should appreciate that the embodiments are not limited to the described order of the actions, because some steps may be performed in other orders or simultaneously. It should be further appreciated by a person skilled in the art that the embodiments all belong to example embodiments, and the involved actions and modules are not necessarily required.

Cross reference may be made to descriptions of the embodiments, and the descriptions of the embodiments may have different focuses. For a part not described in detail in an embodiment, refer to related descriptions of another embodiment. For ease and brevity of description, for example, for functions and performed steps of the apparatuses and devices provided in the embodiments, refer to related descriptions of the method embodiments. The method embodiments and the apparatus embodiments may also be referenced, combined, or cited to each other.

It should be noted that, the foregoing embodiments are merely intended to describe, rather than limit, the embodiments. Although described in detail with reference to the foregoing embodiments, persons of ordinary skill in the art should understand that they may still make modifications without departing from the spirit and scope of the embodiments.

What is claimed is:

1. A positioning information determining method, comprising:
    receiving, by a positioning management device, first information sent by a terminal device, wherein the first information comprises a plurality of antenna identifiers of the terminal device and local antenna coordinates corresponding to each antenna identifier;
    receiving, by the positioning management device, measurement information sent by the terminal device, wherein the measurement information comprises the plurality of antenna identifiers of the terminal device and a measurement result that is of a downlink reference signal and that corresponds to each antenna identifier; and
    determining, by the positioning management device, positioning information of the terminal device based on the first information and the measurement information, wherein the positioning information comprises one or more of the following information: absolute coordinates of the terminal device, orientation or posture information of the terminal device, a rotation angle of the terminal device, or uptilt and downtilt angles of the terminal device,
    wherein the first information further comprises local coordinates of a reference point of the terminal device and/or an antenna identifier that is of the terminal device and that corresponds to the reference point, and the absolute coordinates of the terminal device are absolute coordinates of the reference point of the terminal device.

2. The positioning information determining method according to claim 1, wherein the receiving, by the positioning management device, the first information sent by the terminal device further comprises:
    receiving, by the positioning management device, a positioning capability message of the terminal device sent by the terminal device, wherein the positioning capability message of the terminal device carries the first information, and the positioning capability message indicates that the terminal device has a capability of determining the positioning information by using a plurality of antennas.

3. The positioning information determining method according to claim 2, wherein after receiving, by the positioning management device, the positioning capability message of the terminal device sent by the terminal device, and before receiving, by the positioning management device, the measurement information sent by the terminal device, the method further comprises:
    sending, by the positioning management device, a report request to the terminal device, wherein the report request requests to report the measurement information.

4. The positioning information determining method according to claim 1, wherein before receiving, by the positioning management device, the measurement information sent by the terminal device, the method further comprises:

receiving, by the positioning management device, a positioning capability message of the terminal device sent by the terminal device, wherein the positioning capability message indicates that the terminal device has a capability of determining the positioning information by using a plurality of antennas.

5. The positioning information determining method according to claim 4, wherein after receiving, by the positioning management device, the positioning capability message of the terminal device sent by the terminal device, the method further comprises:

sending, by the positioning management device, a report request to the terminal device, wherein the report request requests to report the measurement information and the first information.

6. The positioning information determining method according to claim 1, wherein the absolute coordinates of the terminal device are the absolute coordinates of the reference point of the terminal device, the reference point is not an antenna of the terminal device, and determining, by the positioning management device, the absolute coordinates of the terminal device based on the first information and the measurement information further comprises:

determining, by the positioning management device, absolute coordinates corresponding to the antenna identifier based on the measurement information, the antenna identifier in the first information, and the local antenna coordinates of the antenna identifier; and determining, by the positioning management device, the absolute coordinates of the reference point based on the absolute coordinates corresponding to the antenna identifier, the local antenna coordinates corresponding to the antenna identifier, and the local coordinates of the reference point;

or the absolute coordinates of the terminal device are the absolute coordinates of the reference point of the terminal device, the reference point is an antenna of the terminal device, the measurement information comprises a measurement result corresponding to the reference point, and determining, by the positioning management device, the absolute coordinates of the terminal device based on the first information and the measurement information further comprises:

determining, by the positioning management device, absolute coordinates corresponding to the antenna identifier and the absolute coordinates of the reference point based on the measurement information, the local coordinates of the reference point, the antenna identifier in the first information, and the local antenna coordinates of the antenna identifier.

7. The positioning information determining method according to claim 1, wherein determining, by the positioning management device, the orientation or the posture information of the terminal device, the rotation angle, and/or the uptilt angles and the downtilt angles of the terminal device based on the antenna information and the measurement information further comprises:

determining, by the positioning management device, an absolute location corresponding to the antenna identifier based on the measurement information, the antenna identifier in the first information, and the local antenna coordinates of the antenna identifier; and determining, by the positioning management device, the orientation or posture information of the terminal device, the rotation angle, and/or the uptilt and downtilt angles of the terminal device based on a conversion relationship between the absolute location corresponding to the antenna identifier and the local antenna coordinates corresponding to the antenna identifier.

8. A positioning information determining method comprising:

sending, by a terminal device, first information to a positioning management device, wherein the first information comprises a plurality of antenna identifiers of the terminal device and local antenna coordinates corresponding to each antenna identifier;

measuring, by the terminal device by using antennas corresponding to the plurality of antenna identifiers, downlink reference signals sent by an access network device; and sending, by the terminal device, measurement information to the positioning management device, wherein the measurement information comprises the plurality of antenna identifiers of the terminal device and a measurement result that is of a downlink reference signal and that corresponds to each antenna identifier, wherein the first information further comprises local coordinates of a reference point of the terminal device and/or an antenna identifier that is of the terminal device and that corresponds to the reference point, and the absolute coordinates of the reference point of the terminal device are absolute coordinates of the terminal device.

9. The positioning information determining method according to claim 8, wherein sending, by the terminal device, the first information to the positioning management device further comprises:

sending, by the terminal device, a positioning capability message of the terminal device to the positioning management device, wherein the positioning capability message of the terminal device carries the first information, and the positioning capability message indicates that the terminal device has a capability of determining positioning information by using a plurality of antennas.

10. The positioning information determining method according to claim 9, wherein after sending, by the terminal device, the positioning capability message of the terminal device to the positioning management device, and before measuring, by the terminal device by using the antennas corresponding to the plurality of antenna identifiers, the downlink reference signals sent by the access network device, the method further comprises:

receiving, by the terminal device, a report request sent by the positioning management device, wherein the report request requests to report the measurement information.

11. The positioning information determining method according to claim 8, wherein before measuring, by the terminal device by using the antennas corresponding to the plurality of antenna identifiers, the downlink reference signals sent by the access network device, the method further comprises:

sending, by the terminal device, a positioning capability message of the terminal device to the positioning management device, wherein the positioning capability message indicates that the terminal device has a capability of determining positioning information by using a plurality of antennas.

12. The positioning information determining method according to claim 11, wherein after sending, by the terminal device, the positioning capability message of the terminal device to the positioning management device, the method further comprises:
receiving, by the terminal device, a report request sent by the positioning management device, wherein the report request requests to report the measurement information and the first information.

13. A communication apparatus, comprising:
a transceiver;
a processor; and
a non-transitory computer-readable storage medium storing a program to be executed by the processor, the program including instructions to:
send first information to a positioning management device, wherein the first information comprises a plurality of antenna identifiers of the apparatus and local antenna coordinates corresponding to each antenna identifier;
measure, by using antennas corresponding to the plurality of antenna identifiers, downlink reference signals sent by an access network device; and
send measurement information to the positioning management device, wherein the measurement information comprises the plurality of antenna identifiers of the apparatus and a measurement result that is of a downlink reference signal and that corresponds to each antenna identifier,
wherein the first information further comprises local coordinates of a reference point of the apparatus and/or an antenna identifier that is of the apparatus and that corresponds to the reference point, and the absolute coordinates of the reference point of the apparatus are absolute coordinates of the apparatus.

14. The communication apparatus according to claim 13, wherein the program further comprises instructions to:
send a positioning capability message of the apparatus to the positioning management device, wherein the positioning capability message of the apparatus carries the first information, and the positioning capability message indicates that the apparatus is configured to determine positioning information by using a plurality of antennas.

15. The communication apparatus according to claim 14, wherein
after sending the positioning capability message of the communication apparatus to the positioning management device, and before measuring, by using the antennas corresponding to the plurality of antenna identifiers, the downlink reference signals sent by the access network device, the apparatus is further configured to receive a report request sent by the positioning management device, wherein the report request requests to report the measurement information.

16. The communication apparatus according to claim 13, wherein
before measuring by using the antennas corresponding to the plurality of antenna identifiers, the downlink reference signals sent by the access network device, sending a positioning capability message of the communication apparatus to the positioning management device, wherein the positioning capability message indicates that the apparatus is configured to determine positioning information by using a plurality of antennas.

17. The communication apparatus according to claim 16, wherein
after sending the positioning capability message of the communication apparatus to the positioning management device, receiving a report request sent by the positioning management device, wherein the report request requests to report the measurement information and the first information.

* * * * *